United States Patent
Jetzfellner

(10) Patent No.: US 11,640,394 B2
(45) Date of Patent: May 2, 2023

(54) METHOD, APPARATUSES AND SYSTEM FOR EXCHANGING DATA BETWEEN A DISTRIBUTED DATABASE SYSTEM AND DEVICES

(71) Applicant: Siemens Aktiengesellschaft, Munich (DE)

(72) Inventor: Thomas Jetzfellner, Aschheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 160 days.

(21) Appl. No.: 17/259,174

(22) PCT Filed: Jun. 17, 2019

(86) PCT No.: PCT/EP2019/065873
§ 371 (c)(1),
(2) Date: Jan. 10, 2021

(87) PCT Pub. No.: WO2020/011491
PCT Pub. Date: Jan. 16, 2020

(65) Prior Publication Data
US 2021/0271665 A1 Sep. 2, 2021

(30) Foreign Application Priority Data
Jul. 11, 2018 (EP) ..................... 18182973

(51) Int. Cl.
G06F 16/23 (2019.01)
G06F 21/60 (2013.01)

(52) U.S. Cl.
CPC ........ *G06F 16/2379* (2019.01); *G06F 21/602* (2013.01)

(58) Field of Classification Search
CPC ..... G06F 16/2379; G06F 21/602; H04L 9/50; H04L 67/56; H04L 2209/805; H04L 9/3239; H04L 63/12
See application file for complete search history.

(56) References Cited

U.S. PATENT DOCUMENTS

| | | |
|---|---|---|
| 7,987,489 B2 | 7/2011 | Krzyzanowski et al. |
| 8,020,201 B2 | 9/2011 | Adusumilli et al. |
| 2004/0133704 A1 | 7/2004 | Krzyzanowski et al. |

(Continued)

FOREIGN PATENT DOCUMENTS

| | | |
|---|---|---|
| DE | 102016215914 A1 | 3/2018 |
| DE | 102016118614 A1 | 4/2018 |

(Continued)

OTHER PUBLICATIONS

Blockchainhub, "Blockchain Oracles," https://blockchainhub.net/blockchain-oracles/; 2018; 5 pages.

(Continued)

*Primary Examiner* — Albert M Phillips, III
(74) *Attorney, Agent, or Firm* — Schmeiser, Olsen & Watts LLP

(57) ABSTRACT

A gateway or a network adapter that allows old devices or legacy devices to be connected to a distributed database system such as a blockchain without having to change any configuration in the old devices is provided.

14 Claims, 3 Drawing Sheets

(56) References Cited

U.S. PATENT DOCUMENTS

| | | | |
|---|---|---|---|
| 2014/0053078 A1* | 2/2014 | Kannan | H04W 4/023 |
| | | | 715/748 |
| 2019/0190720 A1 | 6/2019 | Falk | |
| 2019/0306155 A1* | 10/2019 | Girdhar | H04L 63/0838 |
| 2020/0036520 A1 | 1/2020 | Kilian | |
| 2021/0255906 A1* | 8/2021 | Nasu | G06F 21/602 |

FOREIGN PATENT DOCUMENTS

| | | | |
|---|---|---|---|
| WO | 2017167549 A1 | 10/2017 | |
| WO | WO-2018231255 A1 * | 12/2018 | G06Q 20/06 |

OTHER PUBLICATIONS

Anderon, Ross, "Security Engineering. A Guide to Building Dependable Distributed Systems," Wiley; Jan. 2001; 2001; 600 pages.

Baird, Leemon, "Overview of Swirlds Hashgraph," Swirlds; 2016; 4 pages.

Baird, Leemon, "The Swirlds Hashgraph Consensus Algorithm: Fair, Fast, Byzantine Fault Tolerance," Swirlds Tech Report Swirlds-TR-2016-01; 2016; 28 pages.

The Ethereum Book Project/Mastering Ethereum https://github.com/ethereumbook/ethereumbook, Status: Oct. 24, 2017; 2017; 2 pages.

Needham, Roger M., et al., "Using encryption for authentication in large networks of computers," ACM: Communications of the ACM, vol. 21, No. 12, Dec. 1978; 1978; 8 pages.

Antonopoulous, Andreas M., "Mastering Bitcoin: Unlocking Digital Cryptocurrencies," ★ Reilly, First edition discloses at section; Transaction Age, Fees, and Priority; 2010; 282 pages.

Diedrich, Henning, "Ethereum: Blockchains, Digital Assets, Smart Contracts, Decentralized Autonomous Organizations," CreateSpace Independent Publishing Platform, Sep. 8, 2016 // ISBN-10: 1523930470 // ISBN-13: 978-1523930470; 3 pages.

International Search Report and Written Opinion in corresponding PCT Patent Application No. PCT/EP2019/065873 dated Sep. 11, 2019. 18 pages.

Extended European Search Report in corresponding European Patent Application No. 18182973.0 dated Jan. 9, 2019. 11 pages.

\* cited by examiner

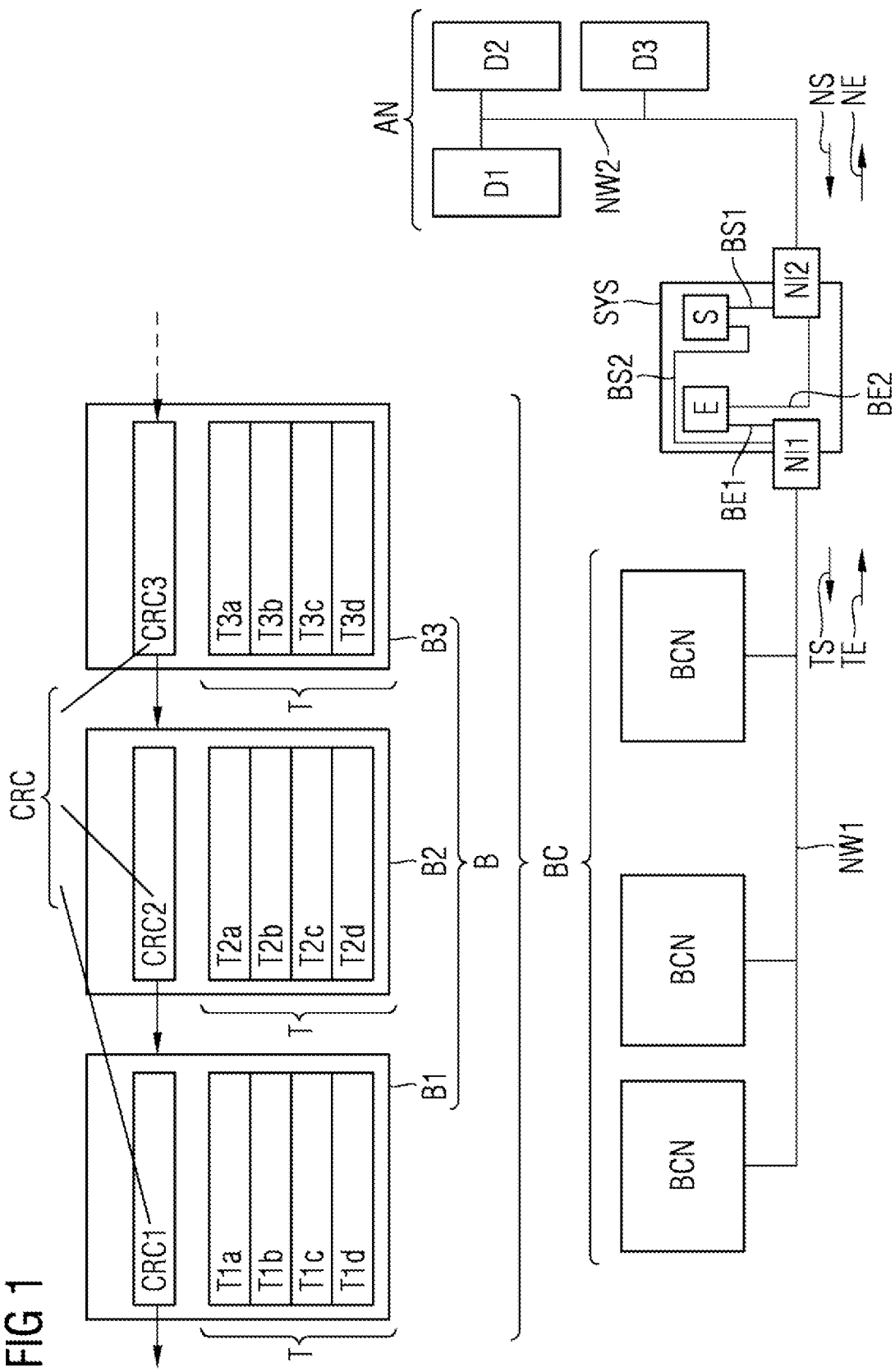

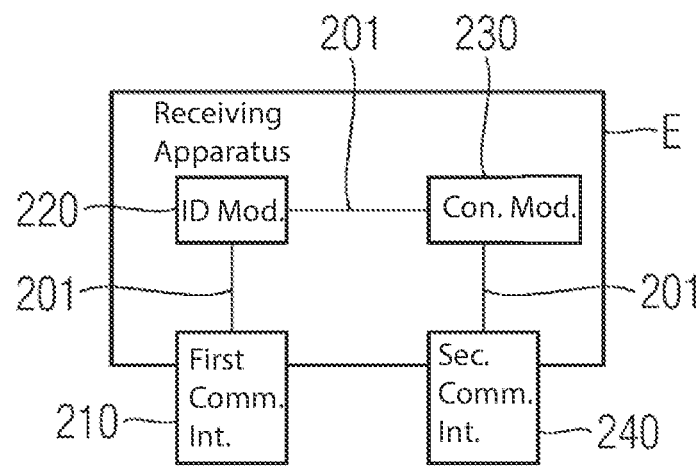
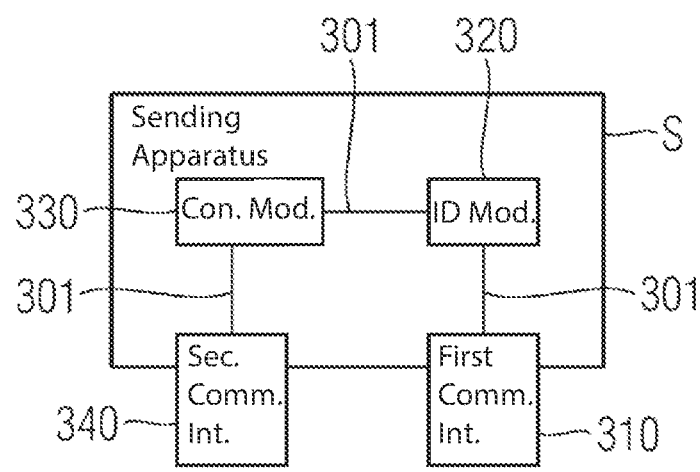

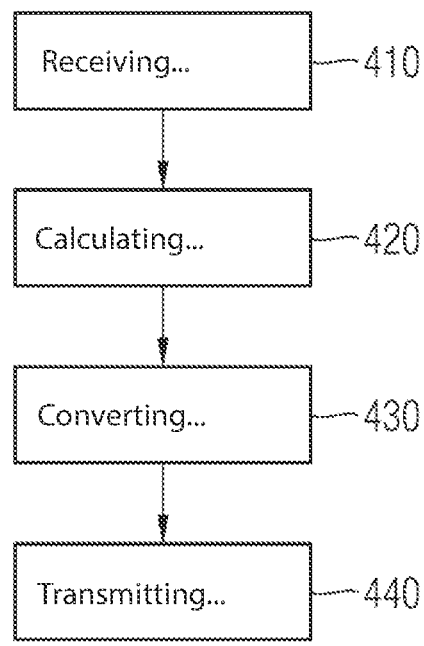
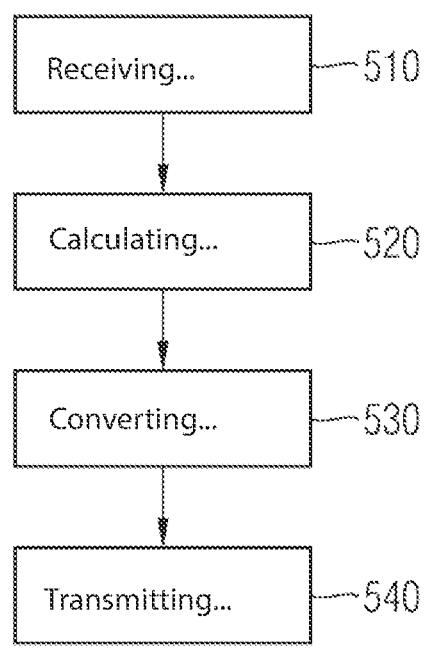

METHOD, APPARATUSES AND SYSTEM FOR EXCHANGING DATA BETWEEN A DISTRIBUTED DATABASE SYSTEM AND DEVICES

CROSS-REFERENCE TO RELATED APPLICATIONS

This application is a national stage entry of PCT Application No. PCT/EP2019/065873 having a filing date of Jun. 17, 2019, which claims priority to European Patent Application No. 18182973.0, having a filing date of Jul. 11, 2018, the entire contents of which are hereby incorporated by reference.

FIELD OF TECHNOLOGY

The following relates to methods, apparatuses and a system for exchanging data between a distributed database system and devices.

BACKGROUND

Devices, such as field devices and manufacturing devices, are becoming increasingly networked and can be provided/operated, for example, by different operators. Command sequences which can be executed by the devices are often forwarded to these devices. It is disadvantageous here that old devices can often no longer readily communicate with the new IT infrastructure.

SUMMARY

An aspect of the present invention is to find an alternative to known solutions from the prior art.

The technology of blockchains or distributed ledgers is currently an intensively discussed technology which can be implemented, in particular, as a distributed database system or as a network application. Along with applications for decentralized payment systems (e.g. Bitcoin), new potential applications are being developed in the financial sector. In particular, transactions between companies can thereby be implemented without an intermediary or clearing house. This enables new business models without a trusted intermediary, it reduces transaction costs, and new digital services can be offered flexibly without having to establish an infrastructure specifically configured for this purpose and trust relationships. A transaction data record (or transaction for short) protected by a blockchain comprises e.g. program code, which can also be referred to as a "smart contract".

According to a first aspect, the present invention relates to a receiving apparatus, comprising:
 for example, a first communication interface, wherein
 for example, the first communication interface is configured to communicate with a distributed database system or a network application,
 for example, the first communication interface is configured to receive first messages or data (e.g. the first messages and/or further data such as e.g. the data of a communication connection) from the distributed database system or the network application;
 for example, an identification module, wherein
 for example, the identification module is configured to use the data or to use the respective message content of the first messages or of the data to calculate an association concerning which devices an applicable first message is intended for or which devices the data are intended for;
 for example, a conversion module, wherein
 for example, the conversion module is configured to convert the data or the message content of the applicable first message or of the data into a data format for the associated device;
 for example, a second communication interface, wherein,
 for example, the second communication interface is configured to transmit the converted data and/or the data and/or the converted message content and/or the message content of the data or of the applicable first message (and/or the first message itself) to the device associated with the applicable first message.

According to a further possible aspect, the present invention relates to a receiving apparatus, comprising:
 for example, a first communication interface, wherein
 for example, the first communication interface is configured to receive data from a network application;
 for example, a conversion module, wherein
 for example, the conversion module is configured to convert the data into a data format for a device associated with the data,
 for example, the conversion module is configured to determine for the device whether and/or how these data should be converted for the applicable device (e.g. the associated device);
 for example, a second communication interface, wherein
 for example, the second communication interface is configured to transmit the converted data and/or the data to the device associated with the data.

According to a further possible aspect, the present invention relates to a receiving apparatus, comprising:
 for example, a first communication interface, wherein
 for example, the first communication interface is configured to receive data from a network application;
 for example, a conversion module, wherein
 for example, the conversion module is configured to determine a conversion check result for a device associated with the data concerning whether and/or how the data should be converted into a data format for the device associated with the data, for example, the conversion module is configured to convert the data into the data format for the device associated with the data on the basis of the conversion check result,
 for example, a second communication interface, wherein
 for example, the second communication interface is configured to transmit the converted data and/or the data to the device associated with the data.

According to a further possible aspect, the present invention relates to a receiving apparatus, comprising:
 a first communication interface (210), wherein
 the first communication interface is configured to receive data from a network application;
 a conversion module (230), wherein
 the conversion module is configured to determine a conversion check result for the data,
 the conversion check result is determined on the basis of a device associated with the data,
 the conversion module is configured to establish, during the determination, whether and/or how the data should be converted into a data format for the device associated with the data,
 the conversion module is configured to convert the data into the data format for the device associated with the data on the basis of the conversion check result;

a second communication interface (240), wherein
the second communication interface is configured to transmit the converted data to the device associated with the data.

For example, the conversion module uses a check to check whether the device associated with the data is capable of processing the data or parts of the data. The result of the applicable check can then e.g. be stored in the conversion check result.

The data may be the first messages or the first message or the message content of the first message or data of a communication connection, for example.

Unless otherwise indicated in the following description, the terms "perform", "calculate", "computer-aided", "compute", "establish", "generate", "configure", "reconstruct" and the like refer to actions and/or processes and/or processing steps which modify and/or generate data and/or convert the data into other data, wherein the data are represented or can occur, in particular, as physical quantities, for example as electrical pulses. In particular, the expression "computer" should be interpreted as broadly as possible in order to cover, in particular, all electronic devices with data processing characteristics. Computers may therefore, for example, be personal computers, servers, programmable logic controllers (PLCs), handheld computer systems, pocket PC devices, mobile radiocommunication devices and other communication devices which can process data in a computer-aided manner, processors and other electronic data processing devices.

"Computer-aided" can be understood in connection with the embodiment of the present invention to mean, for example, an implementation of the method in which, in particular, a processor executes at least one method step of the method. "Computer-aided" is also understood to mean, for example, "computer-implemented".

A processor can be understood in connection with the embodiment of the present invention to mean, for example, a machine or an electronic circuit. A processor may, in particular, be a Central Processing Unit (CPU), a microprocessor or a microcontroller, for example an application-specific integrated circuit or a digital signal processor, possibly in combination with a storage unit for storing program commands, etc. A processor may, for example, also be an IC (Integrated Circuit), in particular an FPGA (Field Programmable Gate Array) or an ASIC (Application-Specific Integrated Circuit), or a DSP (Digital Signal Processor) or a GPU (Graphics Processing Unit). A processor can also be understood to mean a virtualized processor, a virtual machine or a soft CPU. It can also be, for example, a programmable processor which is equipped with configuration steps to carry out said method according to the present invention, or it can be configured with configuration steps in such a way that the programmable processor implements the features according to the present invention of the method, the component, the modules or other aspects and/or partial aspects of the present invention.

A "storage unit" or "storage module" and the like can be understood in connection with the embodiment of the present invention to mean, for example, a volatile storage device in the form of a Random-Access Memory (RAM) or a permanent storage device such as a hard disk or a data medium.

A "module" can be understood in connection with the embodiment of the present invention to mean, for example, a processor and/or a storage unit for storing program commands. The processor is specifically configured, for example, to execute the program commands in such a way that the processor performs functions in order to implement or carry out the method according to the present invention or a step of the method according to the present invention. A module may also be, for example, a node of the distributed database system which implements, for example, the specific functions/features of an applicable module. The respective modules can also be designed, for example, as separate or independent modules. The applicable modules can comprise, for example, further elements for this purpose. These elements are, for example, one or more interfaces (e.g. database interfaces, communication interfaces, e.g. network interface, WLAN interface) and/or an evaluation unit (e.g. a processor) and/or a storage unit. Data can be exchanged (e.g. received, forwarded, transmitted or provided), for example, by means of the interfaces. Data can be compared, verified, processed, associated or calculated, for example, in a computer-aided and/or automated manner by means of the evaluation unit. Data can be stored, retrieved, or provided, for example, in a computer-aided and/or automated manner by means of the storage unit.

"Comprise", particularly in relation to data and/or information, can be understood in connection with the embodiment of the present invention to mean, for example, a (computer-aided) storage of applicable information or of an applicable datum in a data structure/data record (which, for example, is in turn stored in a storage unit).

"Associate", particularly in relation to data and/or information, can be understood in connection with the embodiment of the present invention to mean, for example, a computer-aided association of data and/or information. For this purpose, for example, a first datum is associated by means of a memory address or a unique identifier (UID) with a second datum by storing e.g. the first datum together with the memory address or the unique identifier of the second datum in a data record.

"Provide", particularly in relation to data and/or information, can be understood in connection with the embodiment of the present invention to mean, for example, a computer-aided provision. The provision is effected, for example, via an interface (e.g. a database interface, a network interface, an interface to a storage unit). Applicable data and/or information can be forwarded and/or transmitted and/or retrieved and/or received, for example, via this interface during the provision.

"Provide" can also be understood in connection with the embodiment of the present invention to mean, for example, a loading or storing, for example of a transaction with applicable data. This can be effected, for example, on or by a storage module. "Provide" can also be understood to mean, for example, a transmission (or a sending or a forwarding) of applicable data from one node to another node of the blockchain or of the distributed database system (or its infrastructure) or of the network application.

A "checksum", for example a data block checksum, a data checksum, a node checksum, a transaction checksum, a concatenation checksum or the like can be understood in connection with the embodiment of the present invention to mean, for example, a cryptographic checksum or cryptographic hash or hash value which is formed or calculated, in particular by means of a cryptographic hash function via a data record and/or data and/or one or more of the transactions and/or a partial area of a data block (e.g. the block header of a block of a blockchain or data block header of a data block of the distributed database system (or of the network application) or only a part of the transactions of a data block). A checksum may, in particular, be a checksum(s) or hash value(s) of a hash tree (Merkle tree, Patricia tree). It can further be understood to mean, in particular, a digital signature or a cryptographic message authentication code also. A cryptographic protection/manipulation protection for the transactions and the data(sets) stored therein can be implemented by means of the checksums, for example at different levels of the database system. If, for example, a high level of security is required, the checksums are generated and verified, for example, at the transaction level. If a lower level of security is required, the checksums are generated and verified, for example, at the block level (e.g. over the entire data block or over only a part of the data block and/or a part of the transactions).

A "data block checksum" can be understood in connection with the embodiment of the present invention to mean a checksum which is calculated, for example, over a part of or all transactions of a data block. A node can then check/establish the integrity/authenticity of the applicable part of a data block by means of the data block checksum. Additionally or alternatively, the data block checksum can also be formed, in particular, via transactions of a previous data block/predecessor data block of the data block. The data block checksum can also be implemented, in particular, by means of a hash tree, for example a Merkle tree [1] or a Patricia tree, wherein the data block checksum is, in particular, the root checksum of the Merkle tree or of a Patricia tree or of a binary hash tree. Transactions are secured, in particular, by means of further checksums from the Merkle tree or Patricia tree (e.g. using the transaction checksums), wherein, in particular, the further checksums are leaves in the Merkle tree or Patricia tree. The data block checksum can thus, for example, secure the transactions by formatting the root checksum from the further checksums. The data block checksum can be calculated, in particular, for transactions of a specific data block of the data blocks. A data block checksum of this type can be incorporated, in particular, into a following data block of the specific data block in order to concatenate this following data block, for example with its previous data blocks and, in particular, thus make an integrity of the distributed database system (or of the network application) checkable. As a result, the data block checksum can, for example, perform the function of the concatenation checksum or can be incorporated into the concatenation checksum. The header of a data block (e.g. of a new data block or of the data block for which the data block checksum was formed) can comprise, for example, the data block checksum.

"Transaction checksum" can be understood in connection with the embodiment of the present invention to mean a checksum which is formed, in particular, via a transaction of a data block. In addition, a calculation of a data block checksum can, for example, be speeded up for an applicable data block since, for example, already calculated transaction checksums can equally be used as leaves e.g. of a Merkle tree, for this purpose.

A "concatenation checksum" can be understood in connection with the embodiment of the present invention to mean a checksum which, in particular, indicates or references the previous data block of the distributed database system (or of the network application) to a respective data block of the distributed database system (or of the network application) (in particular frequently referred to in the technical literature as "previous block hash") [1]. In particular, an applicable concatenation checksum is formed for the applicable previous data block for this purpose. A transaction checksum or the data block checksum of a data block (i.e. an existing data block of the distributed database system or of the network application) can be used, for example, as a concatenation checksum to concatenate a new data block with an (existing) data block of the distributed database system (or of the network application). However, it is also possible, for example, for a checksum to be formed over a header of the previous data block or over the entire previous data block and to be used as a concatenation checksum. This can also be calculated, for example, for a plurality or all previous data blocks. It is also feasible, for example, for the concatenation checksum to be formed over the header of a data block and the data block checksum. However, a respective data block of the distributed database system in each case comprises a concatenation checksum which has been calculated for or refers to a previous data block, in particular even more the immediately preceding data block, of the respective data block. It is also possible, for example, for an applicable concatenation checksum to be formed only over a part of the applicable data block (e.g. the previous data block) also. As a result, for example, a data block can be implemented which comprises an integrity-protected part and an unprotected part. A data block, for example, whose integrity-protected part is invariable and whose unprotected part can also be subsequently modified can thus be implemented. "Integrity-protected" is to be understood to mean, in particular, that a modification of integrity-protected data is identifiable by means of a checksum. As already explained, it is equally possible e.g. for a network application to be used instead of the distributed database system.

The data which are stored, for example, in a transaction of a data block can be provided, in particular, in different ways. Instead of the data, e.g. user data such as measurement data or data/ownership structures for assets, a transaction of a data block can comprise, for example, only the checksum for these data. The applicable checksum can be implemented in different ways. This may, for example, be an applicable data block checksum of a data block (with the applicable data) of a different database or of the distributed database system or of the network application, a transaction checksum of a data block with the applicable data (of the distributed database system or of a different database) or a data checksum which has been formed over the data.

In addition, the applicable transaction can also comprise a reference to or an indication of a storage location (e.g. an address of a file server or details of where the applicable data can be found on the file server; or an address of a different distributed database which comprises the data). The applicable data could then, for example, also be provided in a further transaction of a further data block of the distributed database system (or of the network application) (e.g. if the applicable data and the associated checksums are comprised in different data blocks). However, it is also conceivable, for example, for these data to be provided via a different communication channel (e.g. via a different database and/or a cryptographically secured communication channel).

In addition to the checksum, for example, an additional data record (e.g. a reference to or an indication of a storage location) which indicates, in particular, a storage location where the data can be retrieved can also be stored in the applicable transactions. This is advantageous, in particular, for the purpose of minimizing a data quantity of the blockchain or of the distributed database system (or of the network application).

"Security-protected" can be understood in connection with the embodiment of the present invention to mean, for example, a protection which is implemented, in particular, by means of a cryptographic method. This can be implemented, for example, through a use of the distributed database system (or of the network application) for the provision or transmission or sending of applicable data/ transactions. This is achieved through a combination of the different (cryptographic) checksums, whereby said checksums interact, in particular synergistically, in order to, for example, improve the security or the cryptographic security for the data of the transactions. In other words, "security-protected" can also be understood in connection with the present invention to mean, in particular, "cryptographically protected" and/or "manipulation-protected", wherein "manipulation-protected" can also be referred to as "integrity-protected".

"Concatenation of (the) data blocks of a distributed database system (or of the network application)" can be understood in connection with the embodiment of the present invention to mean, for example, that data blocks in each case comprise information (e.g. a concatenation checksum) which refers to or references a different data block or a plurality of different data blocks of the distributed database system (or of the network application) [1] [4] [5].

"Insertion into the distributed database system (or the network application)" and the like can be understood in connection with the embodiment of the present invention to mean, for example, that, in particular, a transaction or the transactions or a data block with its transactions is/are forwarded to one or more nodes of a distributed database system (or of the network application). If these transactions are, for example, successfully validated (e.g. by the node(s)), these transactions are concatenated, in particular, as a new data block with at least one existing data block of the distributed database system (or of the network application) [1][4][5]. The applicable transactions are, for example, stored in a new data block for this purpose. In particular, this validation and/or concatenation can be effected by a trusted node (e.g. a mining node, a blockchain oracle or a blockchain platform). In particular, a blockchain platform or a blockchain as a service can be understood as proposed, in particular, by Microsoft or IBM. In particular, a trusted node and/or a node can in each case store a node checksum (e.g. a digital signature) in a data block (e.g. in the data block validated and generated by it, which is then concatenated) in order to enable, in particular, an identifiability of the creator of the data block and/or an identifiability of the node. This node checksum indicates the node which, for example, has concatenated the applicable data block with at least one other data block of the distributed database system (or of the network application).

"Transaction" or "transactions" can be understood in connection with the embodiment of the present invention to mean, for example, a smart contract [4] [5], a data structure or a transaction data record which in each case comprises, in particular, one of the transactions or a plurality of transactions. "Transaction" or "transactions" can also be understood in connection with the present invention to mean, for example, the data of a transaction of a data block of a blockchain. A transaction can comprise, in particular, a program code which implements, for example, a smart contract. A transaction can also be understood in connection with the present invention to mean, for example, a control transaction and/or confirmation transaction. Alternatively, a transaction may, for example, be a data structure which stores data (e.g. the control commands and/or contract data and/or other data such as video data, user data, measurement data, etc.). A "transaction" can also be or can also be referred to in connection with the present invention, for example, as a message or a communication message. A message is accordingly, for example, a transaction, wherein the message comprises, for example, control commands for controlling the devices and/or also comprises prerequisites (e.g. prescribed requirements) for the execution of the control commands.

In particular, "storage of transactions in data blocks", "storage of transactions" and the like are to be understood to mean a direct storage or indirect storage. A direct storage can be understood to mean, for example, that the applicable data block (of the distributed database system or of the network application) or the applicable transaction (of the distributed database system or of the network application) comprises the respective data. An indirect storage can be understood to mean, for example, that the applicable data block or the applicable transaction comprises a checksum and optionally an additional data record (e.g. a reference to or an indication of a storage location) for applicable data, and the applicable data are therefore not stored directly in the data block (or the transaction), i.e. only a checksum for these data is stored instead. In particular, these checksums can, for example, be validated during the storage of transactions in data blocks, as explained, for example, under "insertion into the distributed database system (or into the network application".

A "program code" (e.g. a smart contract) can be understood in connection with the embodiment of the present invention to mean, for example, a program command or a plurality of program commands which are stored, in particular, in one or more transactions. The program code is, in particular, executable and is executed, for example, by the distributed database system (or by the network application). This can be implemented, for example, by means of an execution environment (e.g. a virtual machine), wherein the execution environment or the program code is Turing-complete. The program code is executed by the infrastructure of the distributed database system (or of the network application) [4][5]. A virtual machine is implemented, for example, by the infrastructure of the distributed database system (or of the network application).

A "smart contract" can be understood in connection with the embodiment of the present invention to mean, for example, an executable program code [4][5] (see, in particular, the definition of "program code"). The smart contract is stored in a transaction of a distributed database system (e.g. a blockchain) or of a network application, for example in a data block of the distributed database system (or of the network application). The smart contract can be executed, for example, in the same way as explained in the definition of "program code", particularly in connection with the present invention.

"Smart contract process" or a "smart contract" can also be understood in connection with the embodiment of the present invention to mean, in particular, an execution of a program code or of a smart contract in a process by the distributed database system or its infrastructure (or by the network application and/or the applicable infrastructure of the network application).

"Proof-of-Work" can be understood in connection with the embodiment of the present invention to mean, for example, solving a computing-intensive problem which is to be solved, in particular, depending on the data block content/ content of a specific transaction [1] [4] [5]. A computing-intensive problem of this type is also referred to, for example, as a cryptographic puzzle.

A "network application" can be understood in connection with the embodiment of the present invention to mean, for example, a locally distributed database, a distributed database system, a distributed database, a peer-to-peer application, a distributed memory management system, a blockchain, a distributed ledger, a distributed storage system, a distributed ledger technology (DLT) based system (DLTS), an audit-compliant database system, a cloud, a cloud service, a blockchain in a cloud or a peer-to-peer database. For example, a network application may be a distributed database system, e.g. implemented by means of a blockchain or a distributed ledger. Different implementations of a blockchain or DLTS, for example, can also be used, such as e.g. a blockchain or a DLTS which is implemented by means of a Directed Acyclic Graph (DAG), a cryptographic puzzle, a hashgraph or a combination of said implementation variants [6][7]. Different consensus methods (consensus algorithms), for example, can also be implemented. This may, for example, be a consensus method by means of a cryptographic puzzle, Gossip about Gossip, Virtual Voting or a combination of said methods (e.g. Gossip about Gossip combined with Virtual Voting) [6][7]. If, for example, a blockchain is used, this can be implemented, in particular, by means of a Bitcoin-based implementation or an Ethereum-based implementation [1][4][5]. A "distributed database system" or a "network application" can also be understood to mean, for example, a distributed database system or a network application of which at least a part of its nodes and/or devices and/or infrastructure is implemented by means of a cloud. The applicable components are implemented, for example, as nodes/devices in the cloud (e.g. as a virtual node in a virtual machine). This can be done, for example, by means of VMware, Amazon Web Services or Microsoft Azure. Due to the high degree of flexibility of the explained implementation variants, partial aspects of said implementation variants, in particular, can also be combined with one another by using e.g. a hashgraph as a blockchain, wherein the blockchain itself can also be e.g. blockless.

If, for example, a Directed Acyclic Graph (DAG) is used (e.g. IOTA or Tangle), transactions or blocks or nodes of the graph, in particular, are interconnected via directed edges. Acyclic means, in particular, that there are no directed loops in the graph.

The distributed database system or the network application may, for example, be a public distributed database system or a public network application (e.g. a public blockchain) or a closed (or private) distributed database system or a closed network application (e.g. a private blockchain).

If it is, for example, a public distributed database system or a public network application, this means that new nodes and/or devices can join or be accepted by the distributed database system or the network application without proof of authorization or without authentication or without login information or without credentials. In such a case, the operators of the nodes and/or devices can, in particular, remain anonymous.

If the distributed database system or the network application is, for example, a closed distributed database system, new nodes and/or devices need, for example, a valid proof of authorization and/or valid authentication information and/or valid credentials and/or valid login information in order to be able to join or be accepted by the distributed database system or the network application.

A distributed database system or the network application may, for example, also be a distributed communication system for data exchange. This may, for example, be a network or a peer-to-peer network.

A/the distributed database system may also be, for example, a local distributed database system and/or a local distributed communication system.

A "network application" may also be, for example, a network application infrastructure, or the network application comprises an applicable network application infrastructure. This infrastructure can comprise nodes and/or communication networks and/or data interface and/or further components, for example, in order to implement or execute the network application. The network application may be e.g. a distributed network application (e.g. a distributed peer-to-peer application or a distributed database system) that is executed on a plurality of nodes of the network application infrastructure, for example.

A "distributed database system", which can also be referred to as a distributed database, for example, can be understood in connection with the embodiment of the present invention to mean, for example, a locally distributed database, a blockchain, a distributed ledger, a distributed storage system, a distributed ledger technology (DLT) based system (DLTS), an audit-compliant database system, a cloud, a cloud service, a blockchain in a cloud or a peer-to-peer database. Different implementations of a blockchain or DLTS, for example, can also be used, such as e.g. a blockchain or a DLTS which is implemented by means of a Directed Acyclic Graph (DAG), a cryptographic puzzle, a hashgraph or a combination of said implementation variants [6][7]. Different consensus methods (consensus algorithms), for example, can also be implemented. This may, for example, be a consensus method by means of a cryptographic puzzle, Gossip about Gossip, Virtual Voting or a combination of said methods (e.g. Gossip about Gossip combined with Virtual Voting) [6][7]. If, for example, a blockchain is used, this can be implemented, in particular, by means of a Bitcoin-based implementation or an Ethereum-based implementation [1][4][5]. A "distributed database system" can also be understood to mean, for example, a distributed database system of which at least a part of its nodes and/or devices and/or infrastructure is implemented by means of a cloud. The applicable components are implemented, for example, as nodes/devices in the cloud (e.g. as a virtual node in a virtual machine). This can be done, for example, by means of VMware, Amazon Web Services or Microsoft Azure. Due to the high degree of flexibility of the explained implementation variants, partial aspects of said implementation variants, in particular, can also be combined with one another by using e.g. a hashgraph as a blockchain, wherein the blockchain itself can also be e.g. blockless.

If, for example, a Directed Acyclic Graph (DAG) is used (e.g. IOTA or Tangle), transactions or blocks or nodes of the graph, in particular, are interconnected via directed edges. This means, in particular, that edges (all edges) have the same direction (always the same direction), similar to e.g. time. In other words, it is, in particular, not possible to run or start the transactions or the blocks or the nodes of the graph backwards (i.e. against the common same direction). Acyclic means in particular that there are no loops in a path of the graph.

The distributed database system may, for example, be a public distributed database system (e.g. a public blockchain) or a closed (or private) distributed database system (e.g. a private blockchain).

If the distributed database system is, for example, a public distributed database system, this means that new nodes and/or devices can join or be accepted by the distributed database system without proof of authorization or without authentication or without login information or without credentials. In such a case, the operators of the nodes and/or devices can, in particular, remain anonymous.

If the distributed database system is, for example, a closed distributed database system, new nodes and/or devices need, for example, a valid proof of authorization and/or valid authentication information and/or valid credentials and/or valid login information in order to be able to join or be accepted by the distributed database system.

A distributed database system may, for example, also be a distributed communication system for data exchange. This may, for example, be a network or a peer-2-peer network. Alternatively or additionally, the embodiment of the present invention can also be implemented, for example, by means of a peer-2-peer application instead of the distributed database system.

A "data block", which can, in particular, depending on the context and implementation, also be referred to as a "member" or "block", can be understood in connection with the embodiment of the present invention to mean, for example, a data block of a distributed database system (e.g. a blockchain or a peer-to-peer database) or of a network application which is implemented, in particular, as a data structure and in each case comprises one of the transactions or a plurality of the transactions. In one implementation, the database (or database system) can, for example, be a DLT-based system (DLTS) or a blockchain and a data block can be a block of the blockchain or of the DLTS. A data block can comprise, for example, details of the size (data size in bytes) of the data block, a block header, a transaction counter and one or more transactions [1]. The block header can comprise, for example, a version, a concatenation checksum, a data block checksum, a timestamp, a proof-of-work and a nonce (once-only value, random value or counter which is used for the proof-of-work) [1] [4] [5]. A data block may, for example, also be only a specific memory area or address area of the entire data which are stored in the distributed database system. Blockless distributed database systems, for example, such as e.g. the IoT Chain (ITC), IOTA, and Byteball, can thus be implemented. Here, in particular, the functionalities of the blocks of a blockchain and of the transactions are combined with one another in such a way that e.g. the transactions themselves secure the sequence or chain of transactions (of the distributed database system), i.e. are stored, in particular, in a security-protected manner. For this purpose, the transactions themselves can be concatenated with one another, for example with a concatenation checksum, whereby a separate checksum or the transaction checksum of one or more transactions serves as a concatenation checksum which, during the storage of a new transaction, is also stored in the distributed database system in the applicable new transaction. In an embodiment of this type, a data block can also comprise, for example, one or more transactions, wherein, in the simplest case, for example, a data block corresponds to a transaction.

"Nonce" can be understood in connection with the invention to mean, for example, a cryptographic nonce (abbreviation for: "used only once" [2] or "number used once"[3]). In particular, a nonce designates an individual number combination or a letter combination which is used once in the respective context (e.g. transaction, data transmission).

"Previous data blocks of a (specific) data block of the distributed database system" can be understood in connection with the embodiment of the present invention to mean, for example, the data block of the distributed database system which, in particular, directly precedes a (specific) data block. Alternatively, "previous data blocks of a (specific) data block of the distributed database system" can also be understood to mean, in particular, all data blocks of the distributed database system which precede the specific data block. As a result, for example, the concatenation checksum or the transaction checksum can be formed only over the data block (or its transactions) directly preceding the specific data block or over all data blocks (or their transactions) preceding the first data block.

A "blockchain node", "node", "node of a distributed database system or of a network application" and the like can be understood in connection with the embodiment of the present invention to mean, for example, devices (e.g. field devices, cell phones), computers, smartphones, clients or participants which perform operations (with) the distributed database system (e.g. a blockchain) [1] [4] [5]. Such nodes can, for example, perform transactions of a network application or of a distributed database system or its data blocks or can insert or concatenate new data blocks with new transactions into the distributed database system (or into the network application) by means of new data blocks. In particular, this validation and/or concatenation can be effected by a trusted node (e.g. a mining node) or exclusively by trusted nodes. A trusted node is, for example, a node which has additional security measures (e.g. firewalls, access restrictions to the node or similar) in order to prevent a manipulation of the node. Alternatively or additionally, during the concatenation of a new data block with the distributed database system, a trusted node can, for example, store a node checksum (e.g. a digital signature or a certificate) in the new data block. In particular, evidence can thus be provided which indicates that the applicable data block has been inserted by a specific node, or indicates its origin. The devices (e.g. the applicable device) are, for example, devices of a technical system and/or industrial plant and/or automation network and/or manufacturing plant which are, in particular, also a node of the distributed database system (or of the network application). The devices can, for example, be field devices or devices in the Internet of Things which are, in particular, also a node of the distributed database system (or of the network application). Nodes can also comprise, for example, at least one processor in order to perform e.g. their computer-implemented functionality.

A "blockchain oracle" and the like can be understood in connection with the embodiment of the present invention to mean, for example, nodes, devices or computers which have e.g. a security module which has, for example, software protection mechanisms (e.g. cryptographic methods), mechanical protection facilities (e.g. a lockable housing) or electrical protection facilities (e.g. tamper protection or a protection system which deletes the data of the security module in the event of an unauthorized use/handling of the blockchain oracle). The security module can comprise, for example, cryptographic keys which are necessary for calculating the checksums (e.g. transaction checksums or node checksums).

A "computer" or "device" can be understood in connection with the embodiment of the present invention to mean, for example, a computer (system), a client, a smartphone, a device or a server which are disposed in each case outside the blockchain and are not part of the infrastructure of the distributed database system (or of the network application), or form a separate, segregated infrastructure. A device is, for example, a manufacturing device and/or an electromechanical device and/or an electronic device and/or a device of an automation network (e.g. for industrial technical plants, manufacturing plants, energy or resource distribution systems), wherein these devices are, in particular, not capable of communicating (directly) with the distributed database system or the network application.

A device of this type outside the distributed database system (or the network application) cannot, for example, access the data of the distributed database system (or of the network application), since the device is, for example, too old and neither has the necessary cryptographic and/or IT security capabilities nor is it compatible with the data format of the distributed database system (or of the network application).

It is possible, in particular, with the embodiment of the present invention to couple a local (blockchain-based) infrastructure with old or legacy devices. A coupling, in particular, of such old devices to a new, blockchain-based infrastructure can be effected with the present invention. This is advantageous, for example, for energy supply networks whose control is converted to a blockchain infrastructure, but wherein not every individual device of the existing energy supply network is exchanged. The present invention allows, for example, messages to be transmitted (e.g. in transactions) with control commands to the individual devices by means of a blockchain, wherein the receiving apparatus is disposed for communication purposes between the devices and the distributed database system (or the network application), and performs the association and/or transmission of the respective messages to an (applicable) device. In particular, the applicable message contents or data are also converted into a data format which is compatible with a device. Data or a message content can, for example, also be cryptographically checked and/or a cryptographic protection can be removed (e.g. by decrypting the message content or the data).

In a first embodiment of the receiving apparatus, the receiving apparatus retrieves a device state (e.g. defective state, operational state) from the device associated with an applicable first message or the applicable data (e.g. by means of the identification module or the second communication interface), wherein a transmission to the associated device is effected on the basis of the retrieved device state.

The receiving apparatus is advantageous for checking, in particular before the forwarding of the message content or the data to the device, whether e.g. the applicable device is switched on or ready for operation. Messages can thus, in particular, be prevented from being transmitted to devices which are in a defective state. If, for example, a message is not transmitted to an applicably associated device (e.g. because this is not possible due to the device state), an applicable message or transaction which comprises this device state (e.g. the defective state) can be forwarded to the distributed database system (or the network application) or can be stored by the distributed database system (or the network application).

In further embodiments of the receiving apparatus, the device state comprises a data record about the available device resources and/or current device properties.

In further embodiments of the receiving apparatus, a transmission to the applicable device is effected if prescribed requirements of the applicable first message are met by the associated device, wherein, for example, the meeting of the prescribed requirements is checked on the basis of the device state.

The receiving apparatus is advantageous, in particular, for checking whether an applicable message can be processed at all by a device. If an applicable message comprises, for example, control commands for starting up or controlling a generator or a reserve power station, it can be prescribed, for example, in the requirements that a specific quantity of energy is at least intended to be generated. Alternatively (i.e. in a different application scenario), a specific manufacturing precision or manufacturing duration which is intended to be adhered to can be prescribed by means of the prescribed requirements. These requirements can be checked, for example, by the receiving apparatus by checking the applicable available device resources and/or the device state and/or the current device properties (e.g. if the device is installed at the correct location to prevent infringement of e.g. any data protection regulations; if the device or the data processed by the device is/are protected against access by unauthorized parties, e.g. cryptographically, in order to protect, in particular, corporate/manufacturing know-how). This checking of the prescribed requirements which are stored e.g. in an applicable data record, can be carried out e.g. by the identification module, the conversion module, the second communication interface (e.g. a network interface) or an evaluation module of the receiving apparatus which is disposed upstream of the communication interface (e.g. a network interface) of a communication bus of the receiving apparatus.

The prescribed requirements can also, for example, be or comprise prerequisite control commands, the prerequisite control commands prescribe, for example, that they are intended to be executed by one of the devices or by the device even before the applicable data and/or messages or message content (e.g. the converted message content or the converted data) is/are forwarded to the devices. Alternatively or additionally, the prerequisite control commands can also relate to further devices, wherein the further devices are, for example, devices of a further automation network. In order to check, for example, whether the prerequisite control commands have already been executed, applicable messages or transactions which, for example, confirm an execution of the prerequisite control commands can, for example, be read out or checked in the distributed database system (or in the network application). These applicable messages or transactions can be referred to, for example, as confirmation transactions and are stored by the applicable devices in the distributed database system (or the network application), for example following an execution of the prerequisite control commands, e.g. by means of the sending apparatus.

In further embodiments of the receiving apparatus, the receiving apparatus comprises a cryptography module, wherein the cryptography module comprises cryptographic data associated with the devices.

In further embodiments of the receiving apparatus, the cryptography module uses the cryptographic data to check and/or decrypt at least a part of the data or a part of the message content of the applicable first message for an associated device, wherein, for example, the applicable cryptographic data are loaded on the basis of the associated device for the checking and/or the decrypting.

The receiving apparatus is advantageous, in particular, for checking the messages which are intended to be forwarded to an applicable device. For this purpose, the message creator may, for example, have received a first cryptographic key with which, for example, a checksum (e.g. a transaction checksum or another of the aforementioned checksums) was formed over the data or the messages or the message content. Alternatively, the message content or the data or a part of the data may, for example, also have been encrypted with this first cryptographic key. The decryption or checking of the applicable message content or the data can be effected, for example, with the first cryptographic key (in the case of a symmetric cryptographic method) or a second cryptographic key which is associated with the first cryptographic key (e.g. in an asymmetric cryptographic method in which e.g. the first key is a private key and the second key is a public key).

The cryptographic data (e.g. the cryptographic keys) may have been generated specifically for a device, for example on the basis of device-specific data (e.g. a UID of the device, a random number which was generated by the applicable device or was calculated on the basis of sensor data characteristic of the device, e.g. a calculated characteristic for a noise signal which was captured by a sensor of the device). Alternatively or additionally, the cryptographic data are a combination of device-specific data and receiving-apparatus-specific data (e.g. a UID of the receiving apparatus, a random number which was generated by the receiving apparatus or was calculated on the basis of sensor data for the receiving apparatus, e.g. a calculated characteristic for a noise signal which was captured by a sensor of the receiving apparatus). It is also possible, for example, for the cryptographic data to be reproducibly ascertained by means of the device-specific data and/or receiving-apparatus-specific data for the applicable device, or for a cryptographic protection (e.g. an encryption) with which the applicable cryptographic data of a device are protected to be removed (e.g. decrypted) and/or checked (e.g. a digital signature is checked) by means of these data. The device-specific data can be retrieved, for example, during the retrieval of the device state for a device. The device-specific data and/or receiving-apparatus-specific data are data which are difficult to falsify, e.g. a characteristic of a noise signal (which is captured e.g. by a sensor or by a manipulation protection module) which is modified during a manipulation of the device in such a way that the characteristic changes in such a way that the cryptographic data become invalid or can no longer be accessed. The device-specific data can also be ascertained or exchanged by means of a challenge-response method, for example by configuring the method on the device side and on the receiving apparatus side with applicable initial values (e.g. by preconfiguring applicable initial values in a protected memory of the device or of the receiving apparatus or by calculating and/or providing these initial values by means of the protected memory), and applicable device-specific data (e.g. a cryptographic key or a part of a cryptographic key) can be retrieved by the receiving apparatus.

In further embodiments of the receiving apparatus, the conversion module is configured to use the device to check which data (e.g. which data parts and/or which part of the data and/or all data) from the data can be processed by the (associated) device.

The result of this check is stored in the conversion check result, for example, the conversion check result indicating which parts of the data or whether data as such should be converted for the associated device, for example. In other words, the conversion check result comprises e.g. device-specific conversion instructions for the data in order to convert the data specifically for the associated device, for example, so that the associated device can e.g. process the applicable data (e.g. also those parts of the data that should be converted). In order to establish whether the data can be executed by the associated device, for example, the device properties and/or the current device properties and/or device information of the associated device can be taken into consideration for the check. The device information can also comprise the applicable device properties (e.g. current device properties), for example.

For example, the data may be available in a text format, XML format or JSON format, but the associated device is able, in accordance with its device properties, to process a specific binary data format (only). The checking then identifies this, for example, and the conversion check result then comprises information indicating that the data need to be converted for processing by the device, for example, and/or can additionally comprise instructions as to how the data should be converted, for example. Data types which are incompatible with the associated device can also be used in the data, for example. These may be, for example, double data types, big integer data types or data formats that the associated device cannot process. An appropriate conversion can be performed for this too, for example, as has already been shown for other examples.

Incompatible means, for example, that applicable data (that is to say e.g. the data format or the data formats of the data) cannot be processed or are not supported (e.g. by the network application or the distributed database system). Compatible means, for example, that applicable data (that is to say e.g. the data format or the data formats of the data) can be processed or are supported (e.g. by the network application or the distributed database system).

If, for example, the checking identifies that parts of the data (e.g. a part of a message content stored in the data) cannot be processed by the associated device (that is to say e.g. the applicable data format for the applicable parts of the data is incompatible) and other parts of the data can be processed by the device, then, for example, the conversion module converts only the data that cannot be processed by the device (or are incompatible). The converted parts of the data and the parts of the data that the associated device was able to execute are then combined again to form (converted) data (or a data record) that e.g. the associated device can process as a whole. The converted data (or data record) are then accordingly transmitted to the associated device.

This is advantageous, for example, if the associated device is able to process date information up to a specific time (e.g. 12.31.1999) only, for example. In such a case it is possible e.g. for current date information (1.1.2018) to be converted into a processable date (e.g. 1.1.1988). The conversion involves, for example, the incompatible data parts (e.g. date information after 12.31.1999) being put into a compatible data format for the associated device (e.g. 1.1.1988) by means of a conversion rule of the device-specific conversion instructions (e.g. current date—30 years).

The checking may also establish that specific parts of the data are not convertible, for example. This means, for example, that there is no way of converting applicable data or parts of the data into a data format that can be processed by the associated device. In such a case it is possible, for example, for a transmission of such data to the associated device to be prevented and/or for an error message to be sent to an administrator. Alternatively or additionally, applicable data or parts of the data can be provided with standard values (e.g. a blank string, a date in a valid format that e.g. is not the current date) so that e.g. at least other parts of the data can be transmitted.

In further embodiments of the receiving apparatus, the receiving apparatus comprises an identification module. The identification module is configured in particular to use the data to calculate an association (or the association) concerning which devices the data are intended for, for example. Alternatively or additionally, the identification module is configured in particular, for example, to use the data to calculate an association or the association in order to determine the associated device, for example.

In other words, the data are used by the identification module to calculate (or establish) which device is intended to process the data, for example. Accordingly, such a device is then associated with the data by means of the association, e.g. in the form of an association data record, for example. The association or the association data record can comprise device information or device properties of the associated device, for example. This association or the association data record can then be used by the conversion module, for example, in order e.g. to check which data (e.g. which part of the data and/or all data) from the data can be processed by the associated device. In further embodiments of the receiving apparatuses, these can additionally each comprise a configuration interface and/or a fan and/or a monitoring module, for example. The configuration interface can be used to load updates or firmware versions, for example. The fan can be used e.g. to cool the receiving apparatus. The monitoring module can be used to monitor the state and/or the operating behavior of the applicable receiving apparatus and e.g. to store it/them in a file (e.g. a logging file).

According to a further aspect, the embodiment of the present invention relates to a sending apparatus, having:
for example a first communication interface, wherein,
for example, the first communication interface is configured to communicate with devices,
for example, the communication interface is configured to receive first messages or data from the devices;
for example, an identification module, wherein,
for example, the identification module is configured to use the data or the respective message content of the first messages to calculate an association concerning which device has sent an applicable first message;
for example, a conversion module, wherein,
for example, the conversion module is configured to convert the data or the message content of the applicable first message into a data format for the distributed database system or the network application;
for example, a second communication interface, wherein,
for example, the second communication interface is configured to communicate with a distributed database system or a network application,
for example, the communication interface is configured to transmit the converted data and/or the data and/or the converted message content and/or the message content of the applicable first message (and/or the first message itself) to the distributed database system or to the network application.

According to a further possible aspect, the embodiment of the present invention relates to a sending apparatus, having
for example, a first communication interface, wherein
for example, the first communication interface is configured to communicate with devices,
for example, the communication interface is configured to receive first messages or data from the devices;
for example, an identification module, wherein,
for example, the identification module is configured to use the data or the respective message content of the first messages to calculate an association concerning which device has sent the data or an applicable first message;
for example, a conversion module, wherein
for example, the conversion module is configured to convert the data or the message content of the applicable first message into a data format for the distributed database system or for a network application,
for example the conversion module is configured to convert the data specifically for the distributed database system or for the network application on the basis of the associated device,
for example the conversion module is configured to check which data formats can be processed by the distributed database system or by the network application or by further distributed database systems or further network applications,
for example the conversion module is configured to convert the data into a data format which is compatible with the distributed database system or the network application;
for example, a second communication interface, wherein,
for example, the second communication interface is configured to communicate with a distributed database system or the network application,
for example, the communication interface is configured to transmit the converted data or the converted message content to the distributed database system or the network application.

According to a further possible aspect, the embodiment of the present invention relates to a sending apparatus, having
for example, a first communication interface, wherein
for example, the first communication interface is configured to communicate with devices,
for example, the communication interface is configured to receive first messages or data from the devices;
for example, an identification module (320), wherein,
for example, the identification module is configured to use the data or the respective message content of the first messages to calculate an association concerning which device has sent the data or an applicable first message;
for example, a conversion module (330), wherein
for example, the conversion module is configured to determine data format requirements specifically for the device associated with the data, which data format requirements are e.g. prescribed by the associated device,
for example, the conversion module is configured to ascertain a check result concerning which data formats can be processed by distributed database systems or by network applications,
for example, the conversion module is configured to take the check result and/or the data format requirements as a basis for converting the data into a data format for a network application from the network applications or a distributed database system from the distributed database systems;
for example, a second communication interface, wherein
for example, the second communication interface is configured to transmit the converted data or the converted message content to the distributed database system or the network application.

For example, the conversion module may be configured to convert the data or the message content of the applicable first message into a data format for the distributed database system or for a network application, wherein the data format is e.g. prescribed by the associated device.

For example, the conversion module may be configured to select the (applicable) distributed database system from the distributed database systems or the (applicable) network application from the network applications on the basis of the check result and/or the data format requirements. For example, the second communication interface may be configured to transmit the converted data and/or the data to the selected (applicable) distributed database system or the selected (applicable) network application. In other words, for example, the network application is the selected network application or the distributed database system is the selected distributed database system.

The data format requirements may, for example, be prescribed by the association and/or by device properties (of the associated device) that are stored in the association (or an association data record).

If, for example, a plurality of distributed database systems or a plurality of network applications meet the data format requirements—that is to say they are each compatible with the data format requirements—then the data can e.g. be converted for the respective compatible distributed database systems or the respective compatible network applications and/or can be transmitted to each of these. Compatible means, for example, that the respective distributed database system or the respective network application supports and/or can process at least one data format of the data format requirements. The data format indicates, for example, a format for data that is able to be processed by the network application or the distributed database system.

For example, it is alternatively or additionally also possible to select from the compatible distributed database systems or from the compatible network applications, for a data conversion (or for a conversion of the data) and/or data transmission (of the converted data or of the data), the network application or the distributed database system that satisfies an additional criterion. The selection criterion may prescribe, for example, a reliability, cryptographic requirements (e.g. key lengths used, cryptographic protocols) or requirements for the applicable infrastructure (e.g. there must be at least a prescribed number of nodes or the network application or the distributed database system is e.g. implemented as a cloud service) that are supposed to be supported by the network application or the distributed database system. For example, only one distributed database system or one network application that best satisfies the selection criterion is then selected.

For example, the second communication interface may be configured to communicate with the distributed database systems (e.g. the distributed database system or the further distributed database systems or the selected distributed database system) or the network applications (e.g. the network application or the further network applications or the selected network application), e.g. in order to retrieve the supported data formats of the network applications or of the distributed database systems and/or to transmit the converted data.

Specific examples of how e.g. a conversion of the data may be implemented can be implemented in a similar manner to the examples of the receiving apparatus.

The data may be the first messages or the first message or the message content of the first message or data of a communication connection, for example.

It is possible, in particular, with the embodiment of the present invention to couple a local infrastructure with old or legacy devices. A coupling, in particular, of such old devices to a new, blockchain-based infrastructure can be effected with the present invention. This is advantageous, for example, for energy supply networks whose control is converted to a blockchain infrastructure, but wherein not every individual device of the existing energy supply network is exchanged. For example, the present invention allows e.g. a device to transmit messages (e.g. with control commands or status messages for processing control commands) to the distributed database system or the network application, wherein the sending apparatus is disposed for communication purposes between the devices and the distributed database system (or the network application) and the association and/or forwarding of the respective messages to the distributed database system (or to the network application) is implemented. In particular, the applicable message contents or data are also converted into a data format which is compatible with the distributed database system (or the network application). In particular, the devices do not have to be adapted to the new infrastructure.

For example, device properties of the associated device prescribe that the data can be stored in one or more data formats in the distributed database system or the network application. For example, the data format requirements can prescribe that the data of the associated device are supposed to be stored in an XML format or a JSON format, but not in a binary format. For example, the distributed database system supports an XML, format and the network application supports only a proprietary binary format. The second communication interface and/or the conversion module first check which data formats supported by the distributed database system or the network application (in this case supported means e.g. which data formats can be processed by the distributed database system or the network application) likewise comply with the data format stipulations of the data format requirements of the associated device. In one variant, the second communication interface then transmits, for example on the basis of the check result ascertained during this check, to which distributed database system (there may also be a plurality of distributed database systems present) or to which network application the converted data are transmitted. This check result can alternatively also be ascertained by the conversion module or by the identification module in the same manner and e.g. provided to the second communication interface.

For example, the second communication interface may be configured to transmit the converted data or the converted message content to the distributed database system or a further distributed database system or the network application or a further network application on the basis of the check result.

In further embodiments of the sending apparatus, the sending apparatus comprises a cryptography module, wherein the cryptography module comprises cryptographic data associated with the devices.

In further embodiments of the sending apparatus, the cryptography module uses the associated device to load applicable cryptographic data, wherein at least a part of the data or a part of the message content of the applicable first message is cryptographically protected in a device-specific manner for the associated device by means of the applicable cryptographic data (which are device-specific), and wherein, for example, the cryptographic protection is effected before the transmission of the message content or of the data (or of the converted variants of the data, messages and message contents mentioned here).

The sending apparatus is advantageous for cryptographically protecting, in particular, the messages which are transmitted to the distributed database system (or to the network application) (and/or are stored thereby). This can be effected, for example, by protecting and/or encrypting the applicable data or the applicable message content by means of a (cryptographic) checksum (e.g. a transaction checksum). For this purpose, the sending apparatus can comprise, for example, a first cryptographic key (this is e.g. specific to the device) with which, for example, a checksum is formed over the data or the messages or the message content. Alternatively, the message content can also be encrypted or else the data can be encrypted, for example, with this first cryptographic key. A recipient of the message can perform the decryption or checking of the applicable message content or of the applicable data, for example, with the first cryptographic key (in the case of a symmetric cryptographic method) or a second cryptographic key which is associated with the first cryptographic key (e.g. in an asymmetric cryptographic method in which e.g. the first key is a private key and the second key is a public key). The applicable key material may have been forwarded here to the recipient, for example via a secure channel.

The cryptographic data (e.g. the cryptographic keys) may have been generated, for example, on the basis of device-specific data (e.g. a UID of the device, a random number which was generated by the applicable device, or was calculated on the basis of sensor data characteristic of the device, e.g. a calculated characteristic for a noise signal which was captured by a sensor of the device). Alternatively or additionally, the cryptographic data are a combination of device-specific data and sending-apparatus-specific data (e.g. a UID of the sending apparatus, a random number which was generated by the sending apparatus or was calculated on the basis of sensor data for the sending apparatus, e.g. a calculated characteristic for a noise signal which was captured by a sensor of the sending apparatus). It is also possible, for example, for the cryptographic data to be reproducibly ascertained by means of the device-specific data and/or sending-apparatus-specific data for the applicable device. For example, a cryptographic protection (e.g. an encryption) with which the applicable cryptographic data of a device are protected can be removed (e.g. decrypted) and/or checked (e.g. a digital signature is checked or a (cryptographic) checksum for the cryptographic data is checked) by means of the device-specific data and/or sending-apparatus-specific data, if a separate cryptographic key is derived or calculated for this purpose e.g. from the device-specific data and/or sending-apparatus-specific data. The device-specific data can be stored, for example, in the message of the applicable device. The device-specific data and/or sending-apparatus-specific data are data which are difficult to falsify, e.g. a characteristic of a noise signal (which is captured e.g. by a sensor or by a manipulation protection module) which is modified during a manipulation of the device in such a way that the characteristic changes in such a way that the cryptographic data become invalid or can no longer be accessed. The device-specific data can also be ascertained or exchanged by means of a challenge-response method, for example by configuring the method on the device side and on the sending apparatus side with applicable initial values (e.g. by preconfiguring initial values in a protected memory of the device or of the sending apparatus or by calculating and/or providing these initial values by means of the protected memory), and applicable device-specific data (e.g. a cryptographic key or a part of a cryptographic key) can be retrieved by the sending apparatus.

In further embodiments of the sending apparatus and/or the receiving apparatus, the network application or the distributed database system is a blockchain, wherein, for example, the messages which are sent and/or received by the distributed database system (or the network application) are transactions.

In further embodiments of the sending apparatus and/or the receiving apparatus, at least some of the devices are devices of an automation network.

In further embodiments of the sending apparatuses, these can additionally each comprise a configuration interface and/or a fan and/or a monitoring module, for example. The configuration interface can be used to load updates or firmware versions, for example. The fan can be used e.g. to cool the sending apparatus. The monitoring module can be used to monitor the state and/or the operating behavior of the applicable sending apparatus and e.g. to store it/them in a file (e.g. a logging file).

According to a further aspect, the embodiment of the present invention relates to a system, comprising:
  for example, a receiving apparatus according to the present invention or a receiving apparatus according to one of the aforementioned embodiments;
  for example, a sending apparatus according to the present invention or a sending apparatus according to one of the aforementioned embodiments.

According to a further aspect, the embodiment of the present invention relates to a method for the computer-aided receiving of messages or data, having the following method steps:
  for example, a method step for receiving data or first messages from a distributed database system or a network application by means of a first communication interface;
  for example, a method step for calculating an association for the first messages, wherein the calculating involves ascertaining which devices an applicable first message or the data is/are intended for;
  for example, a method step for converting the data or the message content of the applicable first message into a data format for the associated device;
  for example, a method step for transmitting the converted message content or the converted data to the device associated with the applicable first message or the data.

In further embodiments of the method, the method comprises further method steps for implementing the functional features or further features of the receiving apparatus or its embodiments.

According to a further possible aspect, the embodiment of the present invention relates to a method for the computer-aided receiving of data, having the following method steps:
  for example, a method step for receiving data or first messages from a distributed database system or a network application by means of a first communication interface;
  for example, a method step for determining a conversion check result for a device associated with the data, wherein
  it is determined whether and/or how the data should be converted into a data format for the device associated with the data, for example,
  the data are converted into the data format for the device associated with the data on the basis of the conversion check result,
  for example, a method step for transmitting the converted data and/or the data to the device associated with the applicable first message or the data.

In further embodiments of the method, the method comprises further method steps for implementing the functional features or further features of the receiving apparatus or its embodiments.

According to a further possible aspect, the embodiment of the present invention relates to a method for the computer-aided receiving of data, having the following method steps:
  receiving data or first messages from a distributed database system or a network application by means of a first communication interface;
  determining a conversion check result for the data, wherein
  the conversion check result is determined on the basis of a device associated with the data,
  it is determined whether and/or how the data should be converted into a data format for the device associated with the data, the data are converted into the data format for the device associated with the data on the basis of the conversion check result, transmitting the converted data and/or the data to the device associated with the applicable first message or the data.

In further embodiments of the method, the method comprises further method steps for implementing the functional features or further features of the receiving apparatus or its embodiments.

According to a further aspect, the embodiment of the present invention relates to a method for the computer-aided sending of messages, having the following method steps:

for example, a method step for receiving data or first (further) messages from devices by means of a communication interface;

for example, a method step for calculating an association on the basis of the data or the respective message content of the first (further) messages, wherein it is calculated which device has sent an applicable first further message or the data;

for example, a method step for converting the data or the message content of the applicable first (further) message into a data format for the distributed database system or the network application;

for example, a method step for transmitting the converted message content or the converted data to the distributed database system or the network application.

In further embodiments of the method, the method comprises further method steps for implementing the functional features or further features of the sending apparatus or its embodiments.

According to a further possible aspect, the embodiment of the present invention relates to a method for the computer-aided sending of data or messages, having the following method steps:

for example, a method step for receiving data or first messages from devices by means of a communication interface;

for example, a method step for calculating an association on the basis of the data or the respective message content of the first messages, wherein it is calculated which device has sent the data or an applicable first further message;

for example, a method step for converting the data or the message content of the applicable first message into a data format for the distributed database system or a network application, wherein the data are converted specifically for the distributed database system or for the network application on the basis of the associated device, for example it is checked which data formats can be processed by the distributed database system or by the network application, for example the data are converted into a data format which is compatible with the distributed database system or the network application;

for example, a method step for transmitting the converted data or the converted message content to the distributed database system or the network application.

In further embodiments of the method, the method comprises further method steps for implementing the functional features or further features of the sending apparatus or its embodiments.

According to a further possible aspect, the embodiment of the present invention relates to a method for the computer-aided sending of messages or data, having the following method steps:

for example, a method step for receiving data or first messages from devices by means of a communication interface;

for example, a method step for calculating an association on the basis of the data or the respective message content of the first messages, wherein it is calculated which device has sent the data or an applicable first further message;

for example, a method step for determining data format requirements, which are determined specifically for the device associated with the data, wherein the data format requirements are e.g. prescribed by the associated device;

for example, a method step for ascertaining a check result concerning which data formats can be processed by distributed database systems or by network applications;

for example, a method step for converting the data into a data format for a network application from the network applications or a distributed database system from the distributed database systems on the basis of the check result and/or the data format requirements;

for example, a method step for transmitting the converted data or the converted message content to the distributed database system or the network application.

In further embodiments of the method, the method comprises further method steps for implementing the functional features or further features of the sending apparatus or its embodiments.

A computer program product (non-transitory computer readable storage medium having instructions, which when executed by a processor, perform actions).

In addition, a variant of the computer program product is claimed, having program commands for configuring a creating device, for example a 3D printer, a computer system or a manufacturing machine suitable for creating processors and/or devices, wherein the creating device is configured with the program commands in such a way that the aforementioned sending apparatus and/or receiving apparatus according to the present invention is/are created.

In addition, a providing apparatus is claimed for storing and/or providing the computer program product. The providing apparatus is, for example a data medium which stores and/or provides the computer program product. Alternatively and/or additionally, the providing apparatus is, for example, a network service, a computer system, a server system, in particular a distributed computer system, a cloud-based computer system and/or a virtual computer system which stores and/or provides the computer program product in the form of a data stream.

This providing is effected, for example, as a download in the form of a program data block and/or command data block, as a file, in particular as a download file, or as a data stream, in particular a download data stream, of the complete computer program product. However, this providing can also be effected, for example, as a partial download which consists of a plurality of parts and is downloaded, in particular via a peer-to-peer network, or is provided as a data stream. A computer program product of this type is loaded into a system, for example, using the providing apparatus in the form of the data medium and executes the program commands so that the method according to the present invention is executed on a computer or the creating device is configured in such a way that it creates the sending apparatus and/or the receiving apparatus according to the present invention.

BRIEF DESCRIPTION

Some of the embodiments will be described in detail, with reference to the following figures, wherein like designations denote like members, wherein:

FIG. 1 depicts a first example embodiment of the present invention;

FIG. 2 depicts a further example embodiment of the present invention;

FIG. 3 depicts a further example embodiment of the present invention;

FIG. 4 depicts a further example embodiment of the present invention; and

FIG. 5 depicts a further example embodiment of the present invention.

DETAILED DESCRIPTION

In the figures, functionally identical elements are denoted by the same reference numbers, unless otherwise indicated.

Unless otherwise indicated or already indicated, the following example embodiments have at least one processor and/or one memory unit in order to implement or carry out the method.

All possibilities which are conventional in the prior art for implementing products or possibilities for the implementation are obviously also known, in particular, to a (relevant) person skilled in the art, so that, in particular, a separate disclosure in the description is not required. In particular, these commonly used implementation variants known to the person skilled in the art can be implemented exclusively through hardware (components) or exclusively through software (components). Alternatively and/or additionally, the person skilled in the art can choose any combinations according to the embodiment of the present invention of hardware (components) and software (components) on the basis of his technical knowledge in order to deploy implementation variants according to the present invention.

A combination according to the embodiment of the present invention of hardware (components) and software (components) can come into play if some of the effects according to the present invention are achieved exclusively through special hardware (e.g. a processor in the form of an ASIC or FPGA) and/or other effects are achieved by the (processor-aided and/or memory-aided) software.

In particular, given the large number of different implementation options, it is impossible and also not expedient or necessary for the understanding of the embodiment of the present invention to specify all these implementation options. In this respect, in particular, all of the following example embodiments are merely intended to indicate some ways in which, in particular, such implementations of the teaching according to the present invention could manifest themselves.

Consequently, in particular, the features of the individual example embodiments are not limited to the respective example embodiment, but relate, in particular, to the embodiment of the present invention in general. Accordingly, features of one example embodiment can also serve as features for another example embodiment, in particular without this having to be explicitly specified in the respective example embodiment.

FIG. 1 shows a first example embodiment of the embodiment of the present invention. FIG. 1 shows a system SYS which comprises a sending apparatus S and a receiving apparatus E. In addition, FIG. 1 shows an automation network AN having a first device D1, a second device D2 and a third device D3. The devices (D1, D2, D3) of the automation network are interconnected for communication purposes via a second network NW2 (e.g. a communication network such as the Internet or an Ethernet network).

FIG. 1 further shows blocks B, for example a first block B1, a second block B2 and a block B3, of a blockchain BC, wherein, in particular, a section of the blockchain BC is shown here by way of example.

The blocks B in each case comprise a plurality of transactions T. The transactions T can comprise control transactions and/or confirmation transactions.

The first block B1 comprises, for example, a first transaction T1a, a second transaction T1b, a third transaction T1c and a fourth transaction T1d.

The second block B2 comprises, for example, a fifth transaction T2a, a sixth transaction T2b, a seventh transaction T2c and an eighth transaction T2d.

The third block B3 comprises, for example, a ninth transaction T3a, a tenth transaction T3b, an eleventh transaction T3c and a twelfth transaction T3d.

The blocks B in each case also additionally comprise one of the concatenation checksums CRC which is formed depending on the immediate predecessor block. The first block B1 thus comprises a first concatenation checksum CRC1 from its predecessor block, the second block B2 comprises a second concatenation checksum CRC2 from the first block B1, and the third block B3 comprises a third concatenation checksum CRC3 from the second block B2.

The respective concatenation checksum CRC1, CRC2, CRC3 is formed over the block header of the applicable predecessor block. The concatenation checksums CRC can be formed using a cryptographic hash function such as e.g. SHA-256, KECCAK-256 or SHA-3. The concatenation checksum can, for example, additionally be calculated via the data block checksum, or the header comprises the data block checksum (the data block checksum is explained below).

In addition, each of the blocks can comprise a data block checksum. This can be implemented, for example, by means of a hash tree.

In order to form the hash tree, a transaction checksum (e.g. similarly a hash value) is calculated for each transaction of a data (block). Alternatively or additionally, a transaction checksum which has been created by the creator of the transaction, during the creation of the transaction, can continue to be used for this purpose.

A Merkle tree or Patricia tree, for example, whose root hash value/root checksum is normally stored in the respective blocks as an applicable data block checksum is normally used for a hash tree.

In one variant, the data block checksum is used as a concatenation checksum.

A block can further have a timestamp, a digital signature, a proof-of-work, as explained in the embodiments of the present invention.

The blockchain BC itself is implemented by a blockchain infrastructure having a plurality of blockchain nodes BCN. The nodes may, for example, be blockchain oracles or trusted nodes or a system SYS. The nodes are interconnected for communication purposes via a first network NW1 (e.g. a communication network such as the Internet or an Ethernet network). At least some of the data blocks B, for example, or all data blocks B of the blockchain BC are replicated for some or all nodes of the blockchain by means of the blockchain infrastructure.

The automation network AN is connected to the distributed database system or a network application by means of the system SYS, wherein e.g. the network application comprises or implements e.g. the distributed database system (e.g. a blockchain). For this purpose, along with the sending apparatus S and the receiving apparatus E, the system SYS comprises a first communication interface NI1 which is connected to the first network NW1 and therefore implements a communication connection to the distributed database system (or the network application). The system SYS further comprises a second communication interface NI2 which is connected to the second network NW2 and therefore implements a communication connection to the automation network AN.

The receiving apparatus E is connected for communication purposes via a first bus BE1 to the first communication interface NI1 and is connected for communication purposes via a second bus BE2 to the second communication interface NI2.

The sending apparatus S is connected for communication purposes via a third bus BS1 to the second communication interface NI2 and is connected for communication purposes via a fourth bus BS2 to the first communication interface NI1.

The system SYS or the sending apparatus S and/or the receiving apparatus E prevent(s) a direct communication between the automation network AN and the distributed database system (implemented e.g. as the blockchain BC) or the network application. This is advantageous since the automation network AN having the devices (D1, D2, D3) may be an old system whose operation may, for example, be disrupted if the messages of the distributed database system (or of the network application) are transmitted directly into the automation network. Problems can occur here, for example in respect of the bandwidth, so that the communication between the devices (D1-D3) is restricted or disrupted e.g. due to a high network load (which is generated by the messages of the distributed database system or of the network application) of the second network NW2. In addition, the operation of the devices may be disrupted, for example, since the devices receive messages which occur in a data format which is not to be processed or is not processable for them.

FIG. 2 and FIG. 3 explain in detail the mode of operation of the sending apparatus S (FIG. 3) and the receiving apparatus E (FIG. 2).

Depending on the implementation variant, the system SYS can also comprise the sending apparatus S or the receiving apparatus E. If the system SYS comprises the sending apparatus S (i.e. without the receiving apparatus E, in which case the sending apparatus S corresponds to the system SYS), a system of this type is advantageous in that it allows, for example, (only) a transmission of the messages from the devices. This may be the case if the devices transmit e.g. status information or transmit control commands, but are not intended/do not have to process any information from the distributed database system (or the network application). If the system SYS comprises, for example, a receiving apparatus E (without the sending apparatus S, in which case the receiving apparatus E corresponds to the system SYS), this can be advantageous if the devices (D1-D3) are intended, for example, only to receive data and process said data without sending/transmitting messages back to the distributed database system (or to the network application). In such a case, for example, information relating to the status of the processing of the messages by the devices could be transmitted via a different communication channel (e.g. by means of sensors which are connected to the distributed database system or the network application via a third communication network or via the first communication network).

The receiving apparatus E comprises a first communication interface 210 (e.g. a network interface to an Ethernet network), an identification module 220, a conversion module 230 and a second communication interface 240 (e.g. a network interface to an Ethernet network) which are interconnected for communication purposes via a bus 201.

The receiving apparatus E is connected for communication purposes via a first bus BE1 to the first communication interface NI1 and is connected for communication purposes via a second bus BE2 to the second communication interface NI2.

The communication interfaces of the receiving apparatus or of the sending apparatus can also be referred to as a communication module or network interface, for example.

The first communication interface 210 is configured to communicate with a distributed database system or a network application and is connected to the first bus BE1. The first communication interface 210 is thus connected for communication purposes via the first bus BE1 to the first communication interface NI1 of the system SYS. The first communication interface is further configured to receive first messages (e.g. the first transaction T1$a$ and/or further transactions of the first block B1) or data from the distributed database system (or the network application). The first messages or data are stored, for example, in a data format (e.g. an XML data format) of the distributed database system (or of the network application).

The identification module is configured to use the data or the respective message content of the data or the respective message content of the first messages to calculate an association concerning which devices an applicable first message TE (e.g. the first message is a message from the first messages) or the (applicable) data is or are intended for. The (applicable) data or an applicable message content can comprise, for example, a digital signature, a digital certificate, a device address (e.g. a network address), a specific technical task, a unique identifier (e.g. a UID) or a combination hereof, on the basis of which the device(s) can be identified. The data or the message or message content can comprise, for example, an indication that the devices are intended to perform a specific technical task. The identification module 220 then identifies the devices which are suitable for performing this task. The task may, for example, be that a reserve power station is intended to provide a prescribed output (e.g. 500 MW) within a prescribed time (e.g. 4 hours) for a prescribed time period (e.g. 24 hours). The identification module 220 then identifies the devices which are necessary for implementing a task of this type. The first device D1 may, for example, be a gas turbine with a 200 MW output, the second device a gas turbine with a 200 MW output, and the third device a gas turbine with a 200 MW output. If the automation network or the devices is/are capable of performing the task, an applicable confirmation message is sent to the distributed database system (or the network application). If the automation network or the devices is/are not capable of performing the task, an applicable rejection message for the task is sent to the distributed database system (or the network application).

The association can be implemented as an association data record, for example, which e.g. comprises the applicable information for association. This may be, for example, a digital certificate of the device, a device address (e.g. a network address), a unique identifier (e.g. a UID) or a combination hereof. The association or the association data record can also comprise further data, for example. These may be, for example, device properties indicating e.g. which data (or data parts) e.g. from data or messages or from an applicable message content (e.g. of the message content of the first message or the first message itself) can be processed by an applicable device (that is to say device determined by an association) and/or which data or which data of the message and/or of the message content need to be converted for the device. The association may, for example, also comprise specific conversion details concerning how the data or the applicable message content or the applicable message needs to be converted.

The association or the association data record can therefore be used, for example, to associate with (the applicable) data or an applicable message or an applicable message content e.g. a device that can process these data or this message or the applicable message content. Such a device associated in this manner can also be referred to as an associated device, for example.

The conversion module 230 is configured to convert the data or the message content of the applicable first message TE (e.g. the first message is a message from the first messages) into a data format for the associated device (e.g. the first device D1). Old devices (legacy devices), in particular, are not capable of processing the communication data of a distributed database system (or of a network application) or of a blockchain. A check is carried out accordingly using the associated device to ascertain which data or which data of the message content can actually be processed by the device and/or a check is also carried out using the associated device to ascertain how these data can be converted for an applicable device. For example, in the case of the abovementioned technical task (controlling the reserve power station) which is stored in the message, can be converted into specific control commands for the devices or generators. The control commands are determined according to the requirements of the task. The first two devices or gas turbines, for example, are used or run at full power and the third gas turbine at half power only in order to provide the required 500 MW output. The data format is e.g. a proprietary data format of the devices.

The second communication interface 240 is configured to transmit the converted message content to the device associated with the applicable first message. The second communication interface 240 is correspondingly connected to the second bus BE2 and is connected for communication purposes via the latter to the second communication interface NI2 of the system SYS. The data or the applicable message content which is transmitted to the applicable device(s) can be transmitted, e.g. in the form of a second message NE, to the device(s).

In one variant, the conversion module 230 is, in particular, an optional module. This is the case, for example, if the data or the message content of the applicable first message does not have to be converted or the data or the message content or the applicable first message has a data format which can be processed by the devices. In such a case, during the transmission to the device(s), the converted message content (or the converted data) corresponds to the (unconverted) message content of the applicable first message (or to the unconverted data). Consequently, the applicable first message is, for example, transmitted as the second message to the device or the applicable devices. The message content of the applicable first message consequently corresponds to the converted message content, in particular for other embodiments, where applicable, of the receiving apparatus.

In this variant, the receiving apparatus can comprise the following features:
for example, a first communication interface, wherein
for example, the first network interface is configured to communicate with a distributed database system or a network application,
for example, the first communication interface is configured to receive data or first messages from the distributed database system or the network application;
for example, an identification module, wherein
for example, the identification module is configured to use the data or the respective message content of the first messages to calculate an association concerning which devices an applicable first message or the data is/are intended for;
for example, a second communication interface, wherein
for example, the second communication interface is configured to transmit the data or the converted data or the converted message content and/or the message content of the applicable first message (and/or the first message itself) to the device associated with the applicable first message.

In one variant, the receiving apparatus retrieves a device state from the device (e.g. device D1) associated with an applicable first message TE or the data. A transmission to the associated device is dependent on the retrieved device state.

A data record, for example, relating to the available device resources and/or current device properties can also be retrieved along with the device state.

Particularly in the case of older devices, it is appropriate to carry out a check to ascertain whether the devices are actually capable of processing the applicable messages.

If, for example, the second turbine (second device) currently has a reduced output as a result of wear or a technical defect, this can be taken into account, for example, during the identification of the devices, and can also be taken into account during the conversion or creation of the control commands to start up or control the gas turbines. The first and the third device, for example, can correspondingly be used or run at full power, and the second device is used correspondingly at half power.

In other words, the transmission to the applicable device(s) is effected if prescribed requirements of the data or of the applicable first message TE are met by the associated device, for example, by checking, on the basis of the device state, that the prescribed requirements are met. The technical task can be defined, for example, by the prescribed requirements. The prescribed requirements can be stored in an applicable data record of the applicable first message TE or of the data. The prescribed requirements may comprise, for example, a requirement to provide 500 MW for 24 h on a prescribed date (e.g. Jul. 9, 2018, at 14:43 hrs) at a prescribed location or region (e.g. Munich or Bavaria or Germany). The prescribed requirements may, for example, comprise manufacturing instructions or manufacturing specifications to manufacture e.g. a gearbox or gearbox parts on a prescribed date (e.g. Jul. 9, 2018, at 14:43 hrs) at a prescribed location or region (e.g. Munich or Bavaria or Germany) within a prescribed time period (starting on the prescribed date), with the prescribed precision (e.g. deviation from CAD data by a maximum of 1 mm). The prescribed requirements can accordingly comprise the aforementioned examples or a combination of the aforementioned examples.

The prescribed requirements may also be or comprise, for example, prerequisite control commands. The prescribed requirements prescribe e.g. that the prerequisite control commands are intended to be executed, for example, by one of the devices or the applicable device even before the data or the applicable messages or message content (e.g. the converted message content) is/are forwarded to the devices. Alternatively or additionally, the prerequisite control commands can also relate to further devices, wherein the further devices are, for example, devices of a further automation network. It is required, for example, that at least a prescribed quantity of fuel has been provided for the generators by the further automation network (e.g. a distribution network for fuel) before the applicable messages are transmitted with control commands to the devices (e.g. turbines, gas turbines). In order to check, for example, whether the prerequisite control commands have already been executed, applicable messages or transactions which, for example, confirm an execution of the prerequisite control commands can, for example, be read out or checked in the distributed database system (or in the network application). These applicable messages or transactions can be referred to, for example, as confirmation transactions and are stored by the applicable devices in the distributed database system (or in the network application), for example following an execution of the prerequisite control commands, e.g. by means of the sending apparatus S. These confirmation transactions can comprise, for example, information relating to the execution of the prerequisite control commands (e.g. location, time and execution duration of the prerequisite control commands), device properties (e.g. which devices have executed the prerequisite control commands), device states (e.g. was the device in a normal operational state, was it in a maintenance state).

The prerequisite control commands are also advantageous if the automation network AN and the devices are a manufacturing plant (e.g. the devices are manufacturing machines). It can also be ensured with the prerequisite control commands, for example, that a workpiece to be manufactured is in a (manufacturing) state so that the control commands of the (converted) message content which is to be transmitted or of the data which are to be transmitted can be executed correctly for a further processing of the workpiece. It is prescribed in the prerequisite control commands, for example, that a workpiece is first processed by a lathe (e.g. the first device D1) and is provided at a prescribed position for further processing. The (current, converted) message content or the (current, converted) data with control commands which is intended to be transmitted is, for example, intended for (i.e. is intended to be transmitted to) a polisher (e.g. the second device D2) which receives and polishes the applicable workpiece at the prescribed position.

The prerequisite control commands are also advantageous if the automation network AN and the devices are, for example, networked cash dispensers or automated teller machines. It can also be ensured, for example, with the prerequisite control commands that a cash payment is made by an automated teller machine (e.g. by the device D1) if an authentication of the bank customer has previously been successfully performed and a confirmation thereof has been stored in applicable confirmation transactions of the distributed database system (or of the network application).

It is prescribed, for example, in the prerequisite control commands (i.e. the prescribed requirements) that e.g. a user authentication must have been successfully performed by means of a prescribed authentication method (e.g. two-factor authentication, PIN entry) before e.g. the payment of the money is permitted or made. The receiving apparatus E transmits (e.g. by means of the second communication interface 240) the applicable (converted) data or the applicable (converted) message content (of the applicable first message) with control commands to the device (e.g. the cash dispenser) only if e.g. a confirmation transaction which confirms, for example, a successful user authentication is present in the distributed database system (or in the network application). The cash dispenser is then configured, for example, with the control commands in such a way that the cash amount required by the user or bank customer is provided and the cash removal flap is then opened.

In these variants, the sending apparatus S is also designed, in particular, to forward the applicable messages or confirmation transactions, where applicable, for the prerequisite control commands to the distributed database system (or to the network application) or to store them in the distributed database system (or in the network application) if the devices have successfully executed the applicable prerequisite control command(s). If, for example, the execution was not successful, this can also be stored in confirmation transactions or applicable messages in the distributed database system (or in the network application).

In one variant, the conversion module 230 is e.g. configured to convert the data or the message content of the applicable first message TE (e.g. the first message is a message from the first messages) into a data format for the associated device (e.g. the first device D1). In particular old devices (what are known as legacy devices) are incapable of processing the communication data of a network application or of a distributed database system or of a blockchain. Accordingly, the associated device is used to check which of the data or parts of the data or data of the message content can be processed by the device (e.g. the associated device), and/or the associated device is used to check how these data can be converted for an applicable device (e.g. the associated device).

The conversion module is then, for example, configured to check for the devices (e.g. on the basis of the association that e.g. was calculated for the determination for an applicable device) how these data (e.g. of the message content or of the message or the parts of the data) should be converted for the applicable device (e.g. the associated device).

For example, in the case of the abovementioned technical task (controlling the reserve power station) which is stored in the data or in the message, can be converted into specific control commands for the devices (e.g. the associated device) or generators. The control commands are determined according to the requirements of the task. The first two devices or gas turbines, for example, are used or run at full power and the third gas turbine at half power only in order to provide the required 500 MW output. The data format is e.g. a proprietary data format of the devices.

For the explained example embodiments, embodiments or variants of these, it is also possible to use data, for example, instead of first messages or the message content of the first message TE.

The data may be the first messages or the first message or the message content of the first message or data of a communication connection, for example.

A few variants of the example embodiment of the receiving apparatus will be explained below, wherein in particular variants of the conversion aspect are explained.

In a further variant, the receiving apparatus can comprise the following features:

for example, a first communication interface, wherein for example, the first network interface is configured to communicate with a distributed database system (or a network application), for example, the first communication interface is configured to receive data or first messages from the distributed database system (or the network application);

for example, an identification module, wherein for example, the identification module is configured to use the data or the respective message content of the first messages to calculate an association in order e.g. to ascertain which devices an applicable first message is intended for;

for example, a conversion module, wherein, for example, the conversion module is configured to convert the data or the message content of the applicable first message TE into a data format for a device (e.g. a device determined by the association such as e.g. a legacy device or one of the devices D1-D3), for example, the conversion module is configured to use the device (e.g. to use the applicable association for an applicable device) to check which data (or data parts) e.g. of the data or of the message content can be processed by the device, for example, the conversion module is configured to check for the device (e.g. on the basis of the association that e.g. was calculated for the determination for an applicable device) how these data (e.g. of the message content or of the message) or data parts should be converted for the applicable device (e.g. the associated device);

for example, a second communication interface, wherein for example, the second communication interface is configured to transmit the data and/or the converted data and/or the converted message content and/or the message content of the applicable first message (and/or the first message itself) to the device associated with the applicable first message.

In a further variant, the receiving apparatus can comprise the following features:

for example, a first communication interface, wherein for example, the first network interface is configured to communicate with a distributed database system (or a network application), for example, the first communication interface is configured to receive data or first messages from the distributed database system (or the network application);

for example, a conversion module, wherein, for example, the conversion module is configured to convert the data or the message content of the applicable first message TE into a data format for a device (e.g. an associated device such as e.g. a legacy device or one of the devices D1-D3 or e.g. a device determined by the association such as e.g. a legacy device or one of the devices D1-D3), for example, the conversion module is configured to use the device to check which data (or data parts) e.g. of the data or of the message content can be processed by the device, for example, the conversion module is configured to check for the device (e.g. the associated device) how these data (or data parts) should be converted for the applicable device (e.g. the associated device);

for example, a second communication interface, wherein for example, the second communication interface is configured to transmit the converted message content and/or the message content of the applicable first message (and/or the first message itself) to the device associated with the applicable first message.

In a further variant, the receiving apparatus can comprise the following features:

for example, a first communication interface, wherein for example, the first communication interface is configured to receive data or first messages from the distributed database system (or a network application);

for example, a conversion module, wherein, for example, the conversion module is configured to convert the data or the message content of the applicable first message TE (e.g. the first message is a message from the first messages) into a data format for a device (e.g. an associated device such as e.g. a legacy device or one of the devices D1-D3 or e.g. a device determined by the association such as e.g. a legacy device or one of the devices D1-D3), for example, the conversion module is configured to use the device to check which data (or data parts) e.g. of the data or of the message content can be processed by the device, for example, the conversion module is configured to check for the device (e.g. the associated device) how these data (or data parts) should be converted for the applicable device (e.g. the associated device);

for example, a second communication interface, wherein for example, the second communication interface is configured to transmit the data and/or the converted data and/or the converted message content and/or the message content of the applicable first message (and/or the first message itself) to the device associated with the applicable first message.

In a further variant, the receiving apparatus can comprise the following features:

for example, a first communication interface, wherein for example, the first communication interface is configured to receive data or first messages from the distributed database system (or the network application);

for example, a conversion module, wherein, for example, the conversion module is configured to convert the data or the message content of the applicable first message TE (e.g. the first message is a message from the first messages) into a data format for a device (e.g. an associated device such as e.g. a legacy device or one of the devices D1-D3 or e.g. a device determined by the association such as e.g. a legacy device or one of the devices D1-D3), for example, the conversion module is configured to use the device to check which data (or data parts) e.g. of the data or of the message content can be processed by the device, for example, the conversion module is configured to check for the device (e.g. the associated device) how these data (or data parts) should be converted for the applicable device (e.g. the associated device);

for example, a second communication interface, wherein for example, the second communication interface is configured to transmit the data and/or the converted data and/or the converted message content and/or the message content of the applicable first message (and/or the first message itself) to the device associated with the applicable first message.

The device for which the message content of the first message TE and/or the first message TE is converted can be converted, for example, on the basis of the device associated with the data or the device associated with the message content and/or the first message TE. This can be controlled e.g. on the basis of the association and/or the association data record and the data stored therein, e.g. by virtue of the association and/or the association data record comprising applicable information or instructions for the conversion.

In a further variant, this can be accomplished, for example, by virtue of the receiving apparatus comprising the following features:
  for example, a first communication interface, wherein
  for example, the first communication interface is configured to receive data or first messages from the distributed database system (or the network application);
  for example, a conversion module, wherein,
  for example, the conversion module is configured to convert the data or the message content of the applicable first message TE (e.g. the first message is a message from the first messages) into a data format,
  for example, into a data format of a device (e.g. an associated device such as e.g. a legacy device or one of the devices D1-D3 or e.g. a device determined by the association such as e.g. a legacy device or one of the devices D1-D3),
  for example, the device is associated with the data or with the message content of the applicable first message TE or with the first message TE by means of an/the association,
  for example, the conversion module is configured to use the device to check which data (or data parts) e.g. of the data or of the message content can be processed by the device,
  for example, the conversion module is configured to check for the device (e.g. the associated device) how these data (or data parts) should be converted for the applicable device (e.g. the associated device);
  for example, a second communication interface, wherein
  for example, the second communication interface is configured to transmit the data and/or the converted data and/or the converted message content and/or the message content of the applicable first message (and/or the first message itself) to the device associated with the applicable first message.

Data parts or part of the data or parts of the data is understood to mean, for example, a data range (e.g. an address range or memory range) and/or data types, wherein the data are, for example, binary data and/or text-based data (e.g. XML, data or JSON, ASCII data) that have a specific data format. The binary data are e.g. data of a binary file and the text-based data are, for example, data of a text file.

For example, the receiving apparatus can also have an identification module as explained in the various variants and example embodiments of the receiving apparatus.

The receiving apparatus is able, for example, instead of the message content of the first message TE, to convert the message TE itself or else the data (e.g. the first messages) of a communication connection and/or to associate it/them with a device and/or to transmit it/them to the associated device.

The first communication interface is e.g. configured to communicate with a distributed database system (or a network application). For example, the first communication interface is configured to receive data or first messages from the distributed database system (or the network application) and/or to communicate with the distributed database system (or the network application) via a communication connection and e.g. to exchange data with the distributed database system (or the network application).

For example, the identification module is configured to use the data or the respective message content of the first messages or the first messages or a message TE from the first messages or the data of the communication connection to calculate an association, e.g. in order to ascertain which devices the data or an applicable first message TE or first messages or the message content of a message (or of the messages) or the data of the communication connection are intended for. In other words, the identification module e.g. associates an applicable device with data (e.g. the respective message content of the first messages or the first messages or the first message TE from the first messages or the data of the communication connection or the message content).

For example, the conversion module is configured to convert the data or the message content of the applicable first message TE or the first messages or the first message or the data of the communication connection into a data format for a device (e.g. a device determined by the association such as e.g. a legacy device or one of the devices D1-D3).

For example, the conversion module is configured to use the device (e.g. to use the applicable association for an applicable device or the associated device) to check which data e.g. of the message content or from the data of the communication connection or the messages or the first message can be processed by the device.

For example, the conversion module is configured to check for the device (e.g. on the basis of the association that e.g. was calculated for the determination for an applicable device) how these data (e.g. of the message content or of the message) should be converted for the applicable device (e.g. the associated device).

For example, the second communication interface is configured to transmit the converted data to the device associated with the applicable data.

The converted data are possibly the respective converted message content of the first messages or the converted first messages or the converted message content or the converted first message TE from the first messages or the converted data of the communication connection.

For example, instead of a distributed database system, a network application can also be used in the example embodiments and variants.

In a further variant, the receiving apparatus can comprise the following features, for example:
  for example, a first communication interface, wherein
  for example, the first communication interface is configured to receive data from a network application;
  for example, a conversion module, wherein,
  for example, the conversion module is configured to convert the data into a data format,
  for example it is converted into the data format of a device (e.g. an associated device such as e.g. a legacy device or one of the devices D1-D3 or e.g. a device determined by the association such as e.g. a legacy device or one of the devices D1-D3),
  for example, the device is associated by means of a/the association of the data,
  for example, the conversion module is configured to use the device to check which data (e.g. which part of the data or which data part) e.g. of the data can be processed by the device,
  for example, the conversion module is configured to check for the device (e.g. the associated device) how these data (e.g. the applicable part of the data) should be converted for the applicable device (e.g. the associated device);

for example, a second communication interface, wherein for example, the second communication interface is configured to transmit the converted data to the device associated with the data or data parts.

The receiving apparatus can, for example, comprise an identification module, wherein, for example, the identification module is configured to use the data to calculate the association in order e.g. to ascertain which devices the data are intended for.

In a further variant of the example embodiment, for example, the receiving apparatus comprises a first communication interface 210, wherein, for example, the first communication interface is configured to receive data from a network application.

Furthermore, for example, the receiving apparatus comprises a conversion module, wherein, for example, the conversion module is configured to convert the data into a data format for a device associated with the data. Moreover, for example, the conversion module is configured to determine for the (associated) device whether and/or how these data should be converted for the applicable (associated) device (e.g. the associated device).

Furthermore, for example, the receiving apparatus comprises a second communication interface (240), wherein, for example, the second communication interface is configured to transmit the converted data and/or the data to the device associated with the data.

In a further variant of the example embodiment, for example, the receiving apparatus comprises a first communication interface, wherein, for example, the first communication interface is configured to receive data from a network application.

Furthermore, for example, the receiving apparatus comprises a conversion module, wherein, for example, the conversion module is configured to determine a conversion check result for the data. The conversion check result indicates e.g. whether and/or how the data should be converted into a data format for the device associated with the data, for example. The conversion check result is determined in a device-specific manner for a device associated with the data (or the device associated with the devices), e.g. in order to establish whether the associated device can actually process the applicable data (or parts of the data) and/or if necessary to convert the data or parts of the data specifically for the associated device.

It is therefore possible, for example, to determine the conversion check result for the data with which e.g. the device is associated in a device-specific manner (e.g. for the associated device). In other words, the conversion module is e.g. configured to determine the conversion check result for the data, wherein e.g. the conversion check result is determined on the basis of the associated device. When determining the check result, for example, a check is performed to determine whether the associated device can (actually) process the data and/or the associated device is also used to check how these data are converted for an applicable device so that the associated device can e.g. process these data. The conversion check result then indicates e.g. whether and/or how the data should be converted into a data format for the device associated with the data, for example.

Furthermore, the conversion module is e.g. configured to convert the data into the data format for the device associated with the data on the basis of the conversion check result.

Furthermore, for example, the receiving apparatus comprises a second communication interface, wherein, for example, the second communication interface is configured to transmit the converted data and/or the data to the device associated with the data.

In further variants of the receiving apparatus, the conversion module is configured to use the device to check which data (e.g. which part of the data and/or all data) from the data can be processed by the (associated) device.

The result of this check is stored in the conversion check result, for example, wherein, for example, the conversion check result indicates which parts of the data or whether the data as such should be converted for the associated device. In other words, the conversion check result comprises e.g. device-specific conversion instructions for the data in order to convert the data specifically for the associated device, for example, so that the associated device e.g. can process the applicable data (e.g. also the parts of the data that should be converted). In order to establish whether the data can be executed and/or processed by the associated device, for example, the device properties and/or the current device properties and/or device information of the associated device can be taken into consideration for the check. The device information can also comprise the applicable device properties (e.g. current device properties), for example.

For example, the data may be available in a text format, XML, format or JSON format, but the associated device is able, in accordance with its device properties, to process a specific binary data format (only). The checking then identifies this and the conversion check result then comprises information indicating that the data need to be converted for processing by the device, for example, and/or can additionally comprise instructions as to how the data should be converted, for example. Data types which are incompatible with the associated device can also be used in the data, for example. These may be, for example, double data types, big integer data types or date formats that the associated device cannot process. An appropriate conversion can be performed for this too, for example, as has already been shown for other examples.

If, for example, the checking identifies that parts of the data (e.g. a part of a message content stored in the data) cannot be processed by the associated device (that is to say e.g. the applicable data format for the applicable parts of the data is incompatible) and other parts of the data can be processed by the device, then, for example, the conversion module converts only the data that cannot be processed by the device (or are incompatible). The converted parts of the data and the parts of the data that the associated device was able to execute are then combined again to form (converted) data (or a data record) that e.g. the associated device can process as a whole. These converted data (or data record) are then accordingly transmitted to the associated device.

This is advantageous, for example, if the associated device is able to process date information up to a specific time (e.g. 12.31.1999) only, for example. In such a case it is possible e.g. for current date information (1.1.2018) to be converted into a processable date (e.g. 1.1.1988). The conversion involves, for example, the incompatible data parts (e.g. date information after 12.31.1999) being put into a compatible data format for the associated device (e.g. 1.1.1988) by means of a conversion rule of the device-specific conversion instructions (e.g. current date—30 years).

The checking may also establish that specific parts of the data are not convertible, for example. This means, for example, that there is no way of converting applicable data or parts of the data into a data format that can be processed by the associated device. In such a case it is possible, for example, for a transmission of such data to the associated device to be prevented and/or for an error message to be sent to an administrator. Alternatively or additionally, applicable data or parts of the data can be provided with standard values (e.g. a blank string, a date in a valid format that e.g. is not the current date) so that e.g. at least other parts of the data can be transmitted.

In further variants of the receiving apparatus, the receiving apparatus comprises an identification module (if not yet present), wherein the identification module is configured in particular to use the data to calculate an association concerning which devices the data are intended for, for example, and wherein the identification module is configured in particular, for example, to use the data to calculate an association or the association in order to determine the associated device, for example.

In other words, the data are used by the identification module to calculate (or establish) which device is intended to process the data, for example. Accordingly, such a device is then associated with the data by means of the association, e.g. in the form of an association data record, for example. The association or the association data record can comprise device information or device properties of the associated device, for example. This association or the association data record can then be used by the conversion module, for example, in order e.g. to check which data (e.g. which part of the data and/or all data) from the data can be processed by the associated device.

In further embodiments of the receiving apparatuses, these can additionally each comprise a configuration interface and/or a fan and/or a monitoring module, for example. The configuration interface can be used to load updates or firmware versions, for example. The fan can be used e.g. to cool the receiving apparatus. The monitoring module can be used to monitor the state and/or the operating behavior of the applicable receiving apparatus and e.g. to store it/them in a file (e.g. a logging file).

The sending apparatus S comprises a first communication interface 310 (e.g. a network interface to an Ethernet network), an identification module 320, a conversion module 330 and a second communication interface 340 (e.g. a network interface to an Ethernet network) which are interconnected for communication purposes via a bus 301.

The first communication interface 310 is configured to communicate with the devices. The first communication interface 310 is connected to the third bus BS1 and is therefore connected for communication purposes to the second communication interface NI2 of the system SYS. The first communication interface is further configured to receive first messages or data from the devices. The data or the first messages are stored e.g. in a proprietary data format of the devices.

The identification module 320 is configured to use the data or the respective message content of the first messages to calculate an association concerning which device has sent an applicable first message NS or the data.

The data or an applicable message content can comprise, for example, a digital signature, a digital certificate, a device address (e.g. a network address), a device status (e.g. a device state) or a unique identifier (e.g. a UID), on the basis of which the applicable device(s) can be identified. The data or the message or message content can comprise, for example, a device status indicating the degree to which the technical task has been accomplished by the devices or by the automation network.

Returning to the abovementioned example with the gas turbines: it could be the case, for example, that the devices in total do not achieve the required output. The total achieved output may, for example, be 300 MW. Individual messages may also have been sent in each case by the devices, indicating e.g. the degree or extent to which they have in each case accomplished the technical task (e.g. first device 50 MW, second device 100 MW, third device 150 MW achieved output). The sending apparatus S or a further device (e.g. which sent the message to the sending apparatus S) of the automation network AN then calculates the extent to which the technical task has been accomplished. The missing part of the output can again be transmitted, for example, as a message via the distributed database system (or the network application) to a further automation network of a coal-fired power station or a wind power station as a second message TS. Said power stations can then, for example, provide the output shortfall in the energy generation. The second message TS is then stored, for example, in transactions (e.g. the twelfth transaction T3$d$) of the distributed database system (or of the network application) or the second message (e.g. the twelfth transaction T3$d$) is already a transaction stored in the distributed database system (or the network application) after it has been successfully sent or transmitted.

The conversion module 330 is configured to convert the data or the message content of the applicable first message NS into a data format for the distributed database system (or the network application). The data or the message content of the applicable first message can be converted, for example, into a generally valid data format (e.g. XML or corresponding to an XML scheme) which is compatible with the distributed database system (or the network application) or is a data format which the distributed database system (or the network application) can process.

In one variant, the conversion module 330 is, in particular, an optional module. This is the case, for example, if the data or the message content of the applicable first message does not have to be converted or the message content or the applicable first message has a data format which can be processed by the distributed database system (or the network application). In such a case, during the transmission to the network application or the distributed database system, the converted message content or the converted data corresponds to the (unconverted) message content of the applicable first message. Consequently, the applicable first message is, for example, transmitted as the second message to the distributed database system (or the network application) or, in a similar manner, the unconverted data are transmitted to the distributed database system or the network application. The message content of the applicable first message consequently corresponds, where applicable, to the converted message content, in particular for applicable embodiments of the sending apparatus.

In this variant, the sending apparatus can comprise the following features:
    for example, a first communication interface, wherein
        for example, the first communication interface is configured to communicate with devices,
        for example, the communication interface is configured to receive first messages or data from the devices;
    for example, an identification module, wherein
        for example, the identification module is configured to use the data or the respective message content of the first messages to calculate an association concerning which device has sent an applicable first message;

for example, a second communication interface, wherein
for example, the second communication interface is configured to communicate with a distributed database system (or a network application),
for example, the communication interface is configured to transmit the data or the converted data or the converted message content and/or the message content of the applicable first message (and/or the first message itself) to the distributed database system (or the network application).

The second communication interface 340 is configured to transmit the converted message content or the converted data to the distributed database system (or the network application). The second communication interface 340 is correspondingly connected to the fourth bus BS2 and is connected for communication purposes via the latter to the second communication interface NI2 of the system SYS. The (applicable) data or the applicable message content which is transmitted to the distributed database system (or the network application) can be transmitted, e.g. in the form of a second message TE, to the device(s). The second message TE may, for example, be a transaction of the distributed database system (or of the network application) here, wherein the second message comprises/stores the converted message content or the converted data.

In different variants, the sending apparatus S and the receiving apparatus E can in each case comprise an independent cryptography module. This is advantageous for increasing security, since, if e.g. an unauthorized party has gained access to the cryptographic data of one of the cryptography modules, this unauthorized party does not automatically gain access to the other cryptographic data of the other cryptography module. Alternatively, the sending apparatus S and the receiving apparatus E can use a shared cryptography module. This is advantageous for minimizing the manufacturing costs for the individual modules. In the case of a shared cryptography module, the applicable cryptographic data can be jointly used by the sending apparatus S and/or the receiving apparatus E.

The cryptography module is protected against access by unauthorized parties by means of a manipulation protection module (e.g. by means of tamper mechanisms/manipulation protection mechanisms). The cryptography module can comprise, for example, a mechanical and/or an electrical and/or electronic and/or electromechanical protection apparatus. This can be implemented, for example, in that the cryptography module stores the cryptographic data for the devices in a protected storage module or storage device (e.g. a key storage device) whose data (only) the cryptography module can access. This storage device and/or the cryptography module is/are correspondingly protected by a steel housing (mechanical protection apparatus) which e.g. prevents access by unauthorized parties. Alternatively or additionally, the cryptography module or the storage device can be protected by an anti-drilling foil. As soon as anyone attempts to access the storage device in an unauthorized manner or via an unauthorized interface, the cryptographic data are e.g. erased.

The cryptography module comprises, for example, cryptographic data specifically for the devices (device-specific cryptographic data).

The cryptographic data may, for example, be one or more cryptographic keys which have been calculated specifically for a respective device. The cryptographic keys may, for example, be symmetric cryptographic keys or asymmetric cryptographic keys (e.g. a public/private key pair).

These cryptographic data can, for example, be stored permanently in or by the cryptography module.

Alternatively, the cryptographic data can be erased from the cryptography module after a prescribed time (e.g. if an applicable device has communicated no data/messages for several hours). If the applicable device communicates again later, the necessary cryptographic key can be recalculated once more. The cryptographic data can accordingly be reproducibly calculated or recalculated for a respective device. Unique, device-specific data of the applicable device, for example, can be used for this purpose. Unique, device-specific data are, for example, a UID of the device, a unique identifier which has been calculated on the basis of sensor data characteristic of the device, e.g. a calculated characteristic for a noise signal which has been captured by a sensor of the device. These unique, device-specific data can be used, for example, in combination with a secret initial value (e.g. a seed) which, for example, has been securely stored or managed by the cryptography module in order to recalculate the applicable cryptographic data. A first secret initial value, for example, can be used to calculate the cryptographic data for the sending apparatus, and a second secret initial value can be used to calculate the cryptographic data for the receiving apparatus. Said calculations are performed by the cryptography module so that e.g. the algorithms that are used and the temporarily calculated data are also protected against access by unauthorized parties.

The cryptography module can then load, calculate or access the applicable cryptographic data, for example by means of the associated device.

The cryptographic data can also be loaded, for example, by first forming a further cryptographic key by means of the device-specific data and/or with apparatus-specific data (e.g. sending-apparatus-specific data and/or receiving-apparatus-specific data) in order to be able, for example, to access the device-specific cryptographic data of an applicable device. As already mentioned, the (device-specific) cryptographic data are stored by or in the cryptography module. A UID of an applicable device, for example, is combined with a secret initial value of the sending apparatus S and/or the receiving apparatus E and/or the system SYS to form the further cryptographic key in order, for example, to decrypt the cryptographic data. The data can be combined, for example, to form a combined character string (UID+secret initial value) in order to form the further cryptographic key. Alternatively or additionally, the combined character string or a part of the combined character string serves as the input parameter for a key derivation function, wherein an applicable key can be reproducibly derived insofar as e.g. the character string having the same/identical content is used as the input parameter.

In the case of the sending apparatus S, for example, at least a part of the data or of the message content of the applicable first message can be cryptographically protected by means of the applicable cryptographic data in a device-specific manner for the associated device (i.e., for example, a device-specific cryptographic protection can be created). This cryptographic protection is provided, for example, before the transmission of the message content or the data. In the case of a receiving apparatus E, at least a part of the data or of the message content of the applicable first message is checked and/or decrypted for an associated device by means of the cryptographic data. A device-specific cryptographic protection is to be understood to mean, for example, that e.g. the data or the messages (or their message content) which originate from an applicable device are protected by means of the device-specific cryptographic data, in order to make the authenticity of the applicable data or the applicable messages or message content checkable.

In the case of the sending apparatus S, this is advantageous, in particular, for protecting the messages which are transmitted to (and/or stored by) the distributed database system (or the network application) (or for cryptographically checking messages which have been sent by the devices, e.g. in a similar manner to the receiving apparatus). This can be effected, for example, by protecting and/or encrypting the applicable data or the applicable message content by means of a (cryptographic) checksum. For this purpose, the sending apparatus S can comprise, for example, a first cryptographic key (this is e.g. specific to the device) with which, for example, a checksum is formed over the data or the messages or message content. Alternatively, the message content or the data, for example, can also be encrypted with this first cryptographic key. A recipient of the message or of the data can perform the decryption or checking of the applicable message content or of the data, for example, with the first cryptographic key (in the case of a symmetric cryptographic method) or a second cryptographic key which is associated with the first cryptographic key (e.g. in an asymmetric cryptographic method in which e.g. the first key is a private key and the second key is a public key). The applicable key material may have been forwarded for this purpose to the recipient, for example via a secure channel.

The cryptographic data (e.g. the cryptographic keys) for e.g. the sending apparatus S, may have been generated, for example, on the basis of device-specific data or uniquely device-specific data of an applicable device (e.g. a UID of the device, a random number which was generated by the applicable device, or was calculated on the basis of sensor data characteristic of the device, e.g. a calculated characteristic for a noise signal which was captured by a sensor of the device). Alternatively or additionally, the cryptographic data are a combination of (uniquely) device-specific data and sending-apparatus-specific data (e.g. a UID of the sending apparatus, a random number which was generated by the sending apparatus or was calculated on the basis of sensor data for the sending apparatus, e.g. a calculated characteristic for a noise signal which was captured by a sensor of the sending apparatus).

The sensor data can be captured, for example, by a sensor which captures e.g. the thermal noise of a circuit of the device, or the noise of the sensor itself can be used. The noise at an unused data interface or at a used data interface, for example, can also be used. This may, for example (e.g. for the devices or for the system SYS), be a token ring network interface of a device or an RS232 interface. The noise of data acquisition hardware, for example, can also be used.

For the sending apparatus S, it is also possible, for example, for the cryptographic data to be reproducibly ascertained by means of the device-specific data and/or sending-apparatus-specific data (e.g. the secret initial value) for the applicable device, or for a cryptographic protection (e.g. an encryption) with which the applicable cryptographic data of a device are protected to be removed (e.g. decrypted) and/or checked (e.g. a digital signature is checked) by means of these data. The device-specific data can be stored, for example, in the message of the applicable device. The device-specific data and/or sending-apparatus-specific data are data which are difficult to falsify, e.g. a characteristic of a noise signal (e.g. which is captured by a sensor or a manipulation protection module). In the event of a manipulation of the device or the apparatus (e.g. the sending apparatus or receiving apparatus), these device-specific data and/or (sending-)apparatus-specific data would be modified in such a way that e.g. the characteristic changes in such a way that the cryptographic data become invalid or can no longer be accessed.

Cryptographic data or key material or device-specific data or uniquely device-specific data of an applicable device can also be exchanged e.g. by means of a challenge-response method. This can be done, for example, by configuring the method on the device side and on the sending apparatus side with applicable initial values (e.g. by preconfiguring initial values in a protected memory of the device or of the sending apparatus or by calculating and/or providing these initial values by means of the protected memory), and/or applicable device-specific data (e.g. a cryptographic key or a part of a cryptographic key) can be retrieved by the sending apparatus.

The receiving apparatus E is advantageous with a cryptography module, in particular for cryptographically checking the messages which are intended to be forwarded to an applicable device (or e.g. also for protecting them, in a similar manner to the sending apparatus). For this purpose, the message creator may, for example, have received a first cryptographic key with which, for example, a checksum has been formed over the messages or message content or the data received by the receiving apparatus E. Alternatively, the message content or the data may, for example, also have been encrypted with this first cryptographic key. The decryption or checking of the applicable message content or of the data can be effected, for example, with the first cryptographic key (in the case of a symmetric cryptographic method) or a second cryptographic key which is associated with the first cryptographic key (e.g. in an asymmetric cryptographic method in which e.g. the first key is a private key and the second key is a public key).

The cryptographic data (e.g. the cryptographic keys) of the receiving apparatus E, may have been generated, for example, on the basis of device-specific data or uniquely device-specific data of an applicable device (e.g. a UID of the device, a random number which was generated by the applicable device, or was calculated on the basis of sensor data characteristic of the device, e.g. a calculated characteristic for a noise signal which was captured by a sensor of the device).

The sensor data can be captured for the receiving apparatus E and/or the system SYS, for example by a sensor which captures e.g. the thermal noise of a circuit of the device or the noise of the sensor itself can be used. The noise at an unused data interface or at a used data interface, for example, can also be used. This may, for example, be a token ring network interface of a device or an RS232 interface. The noise of data acquisition hardware, for example, can also be used.

Alternatively or additionally, the cryptographic data for a receiving apparatus E are a combination of device-specific data and receiving-apparatus-specific data (e.g. a UID of the receiving apparatus, a random number which was generated by the receiving apparatus or was calculated on the basis of sensor data for the receiving apparatus, e.g. a calculated characteristic for a noise signal which was captured by a sensor of the receiving apparatus). It is also possible, for example, for the cryptographic data to be reproducibly ascertained by means of the device-specific data and/or receiving-apparatus-specific data for the corresponding device. For example, a cryptographic protection (e.g. an encryption) with which the applicable cryptographic data of a device are protected can be removed (e.g. decrypted) and/or checked (a digital signature is checked) by means of these device-specific data and/or receiving-apparatus-specific data. For this purpose, a cryptographic key can be calculated, where applicable, on the basis of these data in order to perform the cryptographic operations necessary for this purpose.

The device-specific data of the devices for the receiving apparatus E can be retrieved, for example, during the retrieval of the device state for a device. The device-specific data and/or receiving-apparatus-specific data are data which are difficult to falsify, e.g. a secret initial value or a characteristic of a noise signal (which is captured e.g. by a sensor or by a manipulation protection module) which is modified during a manipulation of the device in such a way that e.g. the characteristic changes in such a way that the cryptographic data in turn become invalid or can no longer be accessed.

If, for example, one device has been replaced by an unauthorized party with a manipulated other device, it is, for example, very difficult to duplicate or falsify the characteristic of a noise signal of the original device by means of the manipulated device. The characteristic of the noise signal (of the manipulated device) is now used, for example, to generate a cryptographic key. An attempt is now made e.g. to decrypt the cryptographic data by means of the cryptographic key. Since the correct key for the decryption could not be formed on the basis of the modified characteristic of the noise signal, the decryption of the cryptographic data, for example, is consequently unsuccessful.

Device-specific or uniquely device-specific data can also be ascertained or exchanged (e.g. during the retrieval of a device state) e.g. by means of a challenge-response method, for example by configuring the method on the device side and on the receiving-apparatus side with applicable initial values (e.g. by preconfiguring applicable initial values in a protected memory of the device or the receiving apparatus or by calculating and/or providing these initial values by means of the protected memory), and applicable device-specific data (e.g. a cryptographic key or a part of a cryptographic key) can be retrieved by the receiving apparatus.

The sending apparatus S and/or the receiving apparatus E can in each case also comprise an initialization module or can use a shared initialization module. This initialization module is configured in such a way that, e.g. in the case of a new device, the applicable cryptographic data are calculated if data are received for this device or are intended to be transmitted to this device for the first time. This can be generated e.g. using the aforementioned methods (unique device-specific data+seed).

In one variant, the sending apparatus S and/or the receiving apparatus E can also form virtual devices which have the applicable interfaces and technical features for communicating with the distributed database system (or the network application). Applicable virtual devices, for example, with a prescribed configuration can be instantiated, wherein the configuration is defined or calculated depending on applicable device information relating to the physical devices. Configuration is to be understood here to mean, for example, the interfaces and functions which an applicable virtual device is intended to provide.

This can be done, for example, by means of a virtualization environment such as e.g. VMware. If a node of the distributed database system (or of the network application) now communicates with a virtual device, the sending apparatus S and/or the receiving apparatus E forwards the applicable information to the old device or legacy device, wherein the applicable conversion and processing are performed before the forwarding, as described above. This is advantageous, in particular, for manufacturing machines if, for example, said machines are not blockchain-enabled, but are intended to be controlled by a blockchain-based control system. The identification module can, for example, use the applicable virtual devices for this purpose, or the identification module is a component/element which is implemented by one or more virtual devices. The virtual devices behave like a node of the distributed database system (or of the network application) and emulate or supplement functions for the physical devices which the latter are lacking for a communication or an interworking with the nodes of the distributed database system (or of the network application).

An applicable identification module (with virtual devices) for a receiving apparatus E can be implemented, for example, as follows. The identification module is configured to use the data or the respective message content of the first messages to calculate an association concerning which virtual devices an applicable first message is intended for. The virtual devices comprise e.g. the conversion module and/or the second communication interface or in each case comprise their own virtual variant thereof, or access the conversion module and/or the second communication interface in order to transmit the data or the messages or message content to the physical device associated with the applicable virtual device.

A receiving apparatus with applicable virtual devices can, for example, have the following features:
  for example, a first communication interface, wherein
  for example, the first network interface is configured to communicate with a distributed database system (or a network application),
  for example, the first communication interface is configured to receive first messages or data from the distributed database system (or the network application);
  for example, virtual devices, wherein
  for example, an applicable (physical) device (e.g. of the automation network AN) is associated in each case with the virtual devices,
  for example, the data or the respective message content (e.g. the target address of the applicable message) of the first messages is used to calculate an association concerning which of the virtual devices an applicable first message or data is intended for;
  for example, a conversion module, wherein,
  for example, the conversion module is configured to convert the data or the message content of the applicable first message into a data format for the associated device;
  for example, a second communication interface, wherein
  for example, the second communication interface is configured to transmit the data and/or the converted data and/or the converted message content and/or the message content of the applicable first message (and/or the first message itself) to the device associated with the applicable first message.

An applicable identification module for a sending apparatus S can be implemented, for example, as follows. The identification module is configured to use the data or the respective message content of the first messages to calculate an association concerning the physical device from which a message has been received. On the basis of this association, it is now established which virtual device is intended to process and/or transmit an applicable message. The virtual devices comprise the conversion module and/or the second communication interface or in each case comprise their own virtual variants thereof or access the conversion module and/or the second communication interface in order to transmit the data or the messages or message content by means of the applicable virtual device to the distributed database system (or the network application).

A sending apparatus S with applicable virtual devices can, for example, have the following features:
for example, a first communication interface, wherein
for example, the first communication interface is configured to communicate with devices,
for example, the communication interface is configured to receive first messages or data from the devices;
for example, virtual devices, wherein
for example, an applicable (physical) device (e.g. of an automation network) is associated in each case with the virtual devices, for example, the data or the respective message content (e.g. the network address of the transmitter) of the first messages is used to calculate an association concerning which device has transmitted an applicable first message or the data;
for example, a conversion module, wherein,
for example, the conversion module is configured to convert the data or the message content of the applicable first message into a data format for the distributed database system (or the network application);
for example, a second communication interface, wherein
for example, the second communication interface is configured to communicate with a distributed database system (or a network application),
for example, the communication interface is configured to transmit the data and/or the converted data and/or the converted message content and/or the message content of the applicable first message (and/or the first message itself) to the distributed database system (or the network application).

The aforementioned variants with the virtual devices can also, for example, dispense with the conversion module if, for example, no data conversion is necessary.

The variants with the virtual devices can in each case also comprise an applicable cryptography module comprising the applicable cryptographic data for a device (physical and/or virtual) and/or for a plurality of devices (physical and/or virtual). For this purpose, a virtual device, for example, can in each case comprise an applicable cryptography module or the virtual devices access a shared cryptography module.

The receiving apparatus E can, for example, be implemented passively or actively.

In the case of an active implementation, the first messages are sent, for example, directly by the distributed database system (or the network application) to the receiving apparatus E or the system SYS (or are received by the receiving apparatus E or the system SYS). The applicable messages can comprise e.g. an indication of which device of the automation network AN the applicable message is intended for.

In the case of a passive implementation, the first messages are received, for example, indirectly by the receiving apparatus E or the system SYS. For this purpose, the receiving apparatus E or the system SYS picks up or receives the messages from the first network NW1, for example with a packet filter or network analysis tool (e.g. Wireshark) or a tool for retrieving data packets from the network (e.g. WinPCap, libpcap). The applicable messages are e.g. not addressed to the receiving apparatus E (or the system SYS) or its network address, but are addressed to the devices of the automation network AN (whereby e.g. a specific device type is indicated in the message or its content).

In order to establish whether, for example, an applicable first message is intended for a device of the automation network AN, the receiving apparatus (or the system SYS) comprises, for example, a device database which comprises a directory of the devices of the automation network AN. In addition, for example, device information relating to the respective devices can also be stored in this directory. The device information can comprise, for example, general information relating to a device. This may, for example, be technical features such as performance, manufacturing speed, energy consumption, manufacturing precision, location of the device or a combination hereof. Alternatively or additionally, the applicable device information can also comprise the most recently received or retrieved device state. If a device state has already been received, for example within a prescribed time period, a further retrieval of the current device state, for example, can thus be dispensed with. If the prescribed time period is 5 minutes and if a device state for the device was received 1 minute ago, it is, for example, not necessary to receive a device state again until the expiry of the prescribed time period.

The device information can also comprise the applicable device properties (e.g. current device properties), for example.

The sending apparatus S can, for example, be implemented passively or actively.

In the case of an active implementation, the first messages are sent, for example, directly by the devices of the automation network to the sending apparatus S or the system SYS. The applicable messages can comprise e.g. an indication of which network application or which distributed database system (if there are a plurality of these systems) or network (e.g. the first communication network) the applicable message is intended for.

In the case of a passive implementation, the first messages are received, for example, indirectly by the sending apparatus S or the system SYS. For this purpose, the sending apparatus S or the system SYS picks up or receives the messages from the second network NW2, for example with a packet filter or network analysis tool (e.g. Wireshark) or a tool for retrieving data packets from the network (e.g. WinPCap, libpcap). The applicable messages are e.g. not addressed to the sending apparatus S (or the system SYS) or its network address, but are addressed e.g. to a different address or different device. A part of an originally present communication infrastructure, for example, may have been replaced by the distributed database system (or the network application) and the applicable devices or network addresses to which the applicable first messages are intended to be sent no longer exist. Since the applicable devices can also no longer be readily reconfigured, the applicable messages would not be available for the new communication infrastructure or could not be forwarded thereto without the sending apparatus S.

The sending apparatus S can also comprise a device database (e.g. similar to the receiving apparatus) in order to establish, for example, which device has sent an applicable message. If the messages are, for example, initially received passively, such information can be determined, for example, on the basis of the transmission address of the message. The device information is retrieved e.g. by means of the transmission address for this purpose.

The embodiment of the present invention is advantageous for allowing, e.g. legacy devices to whose configuration no modifications are permitted, to communicate with a new blockchain infrastructure. The conversion of the data is performed by the apparatus or the system.

The apparatuses (e.g. the sending apparatus or the receiving apparatus) or the system can in each case execute smart contracts for the legacy systems or devices. The devices can thus, in particular, be rendered blockchain-enabled without making any modifications at all to these devices.

In particular, these apparatuses or the system comprise(s) the necessary components for communicating with a blockchain. These are, for example, key memories with cryptographic keys for signing transactions/messages for the blockchain or for checking corresponding checksums.

In one implementation variant, one module, a plurality of modules or all modules can be implemented as a software component or as a hardware component or as a combination of hardware and software components.

The system and/or the modules and/or the sending apparatus and/or the receiving apparatus and/or the distributed database system and/or the network application and/or the network infrastructure of the network application and/or nodes of the network application and/or the nodes of the distributed database system (e.g. blockchain nodes) and/or devices can, for example, in each case additionally comprise one or more further components also, such as, for example, a processor, a memory unit, further communication interfaces (e.g. Ethernet, WLAN), an input device, in particular a computer keyboard or a computer mouse, and a display device (e.g. a monitor). The processor may comprise, for example, a plurality of further processors which can be used, in particular, for the implementation of further example embodiments.

The processor may, for example, be an ASIC which has been implemented in an application-specific manner for the functions of a respective module or all modules of the example embodiment (and/or further example embodiments), wherein the program component or the program commands are implemented, in particular, as integrated circuits. The processor may also, for example, be an FPGA which is configured, in particular by means of the program commands, in such a way that the FPGA implements the functions of a respective module or all modules of the example embodiment (and/or further example embodiments).

In the aforementioned example embodiments, the network interfaces can also be designed as integral network interfaces. For example, the first communication interface NI1 of the system SYS and the first communication interface 210 of the receiving apparatus E and/or the second communication interface 340 of the sending apparatus S can be designed as a first integral communication interface. For example, the second communication interface NI2 of the system SYS and the second communication interface 240 of the receiving apparatus E and/or the first communication interface 310 of the sending apparatus S can be designed as a second integral communication interface. The first integral communication interface and the second integral communication interface can be designed, for example, as a shared integral communication interface.

In further variants, the sending apparatus S and/or the receiving apparatus E and/or the system SYS can be designed, for example, as an integral component of one of the devices, wherein the applicable communication interfaces for communicating with the applicable device are, for example, in such a case a communication interface for a data bus (e.g. a PCI interface, a USB interface). In such a variant, for example, legacy devices or devices can be connected directly to the distributed database system (or the network application) by integrating, for example, the sending apparatus S and/or the receiving apparatus E and/or the system SYS into a communication interface of the legacy device or the device (e.g. as an ASIC or FPGA). The communication interface of the device may, for example, be an exchangeable network card, wherein, for example, an old network card has been replaced by an applicable communication interface according to the present invention. In other words, in a variant of this type, a communication interface can comprise the sending apparatus S and/or the receiving apparatus E and/or the system SYS, or the communication interface is designed as the sending apparatus S and/or the receiving apparatus E and/or the system SYS.

In a further possible variant of the sending apparatus, the sending apparatus comprises the following:
for example, a first communication interface, wherein
for example, the first communication interface is configured to communicate with devices,
for example, the communication interface is configured to receive first messages or data from the devices;
for example, an identification module, wherein,
for example, the identification module is configured to use the data or the respective message content of the first messages to calculate an association concerning which device has sent the data or an applicable first message;
for example, a conversion module, wherein
for example, the conversion module is configured to convert the data or the message content of the applicable first message into a data format for the distributed database system or for a network application,
for example, the conversion module is configured to convert the data specifically for the distributed database system or for the network application on the basis of the associated device,
for example, the conversion module is configured to check which data formats can be processed by the distributed database system or by the network application or by further distributed database systems or further network applications,
for example, the conversion module is configured to convert the data into a data format which is compatible with the distributed database system or the network application;
for example, a second communication interface, wherein
for example, the second communication interface is configured to communicate with a distributed database system or the network application,
for example, the communication interface is configured to transmit the converted data or the converted message content to the distributed database system or the network application.

In a further possible variant of the sending apparatus, the sending apparatus comprises the following:
for example, a first communication interface, wherein
for example, the first communication interface is configured to communicate with devices,
for example, the communication interface is configured to receive first messages or data from the devices;
for example, an identification module (320), wherein,
for example, the identification module is configured to use the data or the respective message content of the first messages to calculate an association concerning which device has sent the data or an applicable first message;
for example, a conversion module (330), wherein
for example, the conversion module is configured to determine data format requirements specifically for the device associated with the data, which data format requirements are e.g. prescribed by the associated device, for example, the conversion module is configured to ascertain a check result concerning which data formats can be processed by distributed database systems or by network applications, for example, the conversion module is configured to take the check result and/or the data format requirements as a basis for converting the data into a data format for a network application from the network applications or a distributed database system from the distributed database systems;

for example, a second communication interface, wherein for example, the second communication interface is configured to transmit the converted data or the converted message content to the distributed database system or the network application.

For example, the conversion module may be configured to convert the data or the message content of the applicable first message into a data format for the distributed database system or for a network application, wherein the data format is e.g. prescribed by the associated device.

For example, the conversion module may be configured to select the (applicable) distributed database system from the distributed database systems or the (applicable) network application from the network applications on the basis of the check result and/or the data format requirements. For example, the second communication interface may be configured to transmit the converted data and/or the data to the selected (applicable) distributed database system or the selected (applicable) network application. In other words, for example, the network application is the selected network application or the distributed database system is the selected distributed database system.

The data format requirements may, for example, be prescribed by the association and/or by device properties (of the associated device) that are stored in the association (or an association data record).

If, for example, a plurality of distributed database systems or a plurality of network applications meet the data format requirements—that is to say they are each compatible with the data format requirements—then the data can e.g. be converted for the respective compatible distributed database systems or the respective compatible network applications and/or can be transmitted to each of these. Compatible means, for example, that the respective distributed database system or the respective network application supports and/or can process at least one data format of the data format requirements. The data format indicates, for example, a format for data that is able to be processed by the network application or the distributed database system.

For example, it is alternatively or additionally also possible to select from the compatible distributed database systems or from the compatible network applications, for a data conversion (or for a conversion of the data) and/or data transmission (of the converted data or of the data), the network application or the distributed database system that satisfies an additional selection criterion. The selection criterion may prescribe, for example, a reliability, cryptographic requirements (e.g. key lengths used, cryptographic protocols) or requirements for the applicable infrastructure (e.g. there must be at least a prescribed number of nodes or the network application or the distributed database system is e.g. implemented as a cloud service) that are supposed to be supported by the network application or the distributed database system. For example, only one distributed database system or one network application that best satisfies the selection criterion is then selected.

For example, the second communication interface may be configured to communicate with the distributed database systems (e.g. the distributed database system or the further distributed database systems or the selected distributed database system) or the network applications (e.g. the network application or the further network applications or the selected network application), e.g. in order to retrieve the supported data formats of the network applications or of the distributed database systems and/or to transmit the converted data.

Specific examples of how e.g. a conversion of the data may be implemented can be implemented in a similar manner to the examples of the receiving apparatus.

The data may be the first messages or the first message or the message content of the first message or data of a communication connection, for example.

It is possible, in particular, with the embodiment of the present invention to couple a local infrastructure with old or legacy devices. A coupling, in particular, of such old devices (e.g. legacy devices) to a new, blockchain-based infrastructure can be effected with the present invention. This is advantageous, for example, for energy supply networks whose control is converted to a blockchain infrastructure, but wherein not every individual device of the existing energy supply network is exchanged. For example, the present invention allows e.g. a device to transmit messages (e.g. with control commands or status messages for processing control commands) to the distributed database system or the network application, wherein the sending apparatus is disposed for communication purposes between the devices and the distributed database system (or the network application) and the association and/or forwarding of the respective messages to the distributed database system (or to the network application) is implemented. In particular, the applicable message contents or data are also converted into a data format which is compatible with the distributed database system (or the network application). In particular, the devices do not have to be adapted to the new infrastructure.

For example, device properties of the associated device prescribe that the data can be stored in one or more data formats in the distributed database system or the network application. For example, the data format requirements can prescribe that the data of the associated device are supposed to be stored in an XML format or a JSON format, but not in a binary format. For example, the distributed database system supports an XML, format and the network application supports only a proprietary binary format. The second communication interface and/or the conversion module first check which data formats supported by the distributed database system or the network application (in this case supported means e.g. which data formats can be processed by the distributed database system or the network application) likewise comply with the data format stipulations of the data format requirements of the associated device. In one variant, the second communication interface then transmits, for example on the basis of the check result ascertained during this check, to which distributed database system (there may also be a plurality of distributed database systems present) or to which network application the converted data are transmitted. This check result can alternatively also be ascertained by the conversion module or by the identification module in the same manner and e.g. provided to the second communication interface.

For example, the second communication interface may be configured to transmit the converted data or the converted message content to the distributed database system or a further distributed database system or the network application or a further network application on the basis of the check result.

The sending apparatuses and/or receiving apparatuses and/or distributed database systems (or their example embodiments, embodiments or variants) and/or network application explained in the patent application can additionally each comprise a configuration interface and/or a fan and/or a monitoring module, for example. The configuration interface can be used to load updates or firmware versions, for example. The fan can be used e.g. to cool the applicable sending apparatus S and/or the receiving apparatus E and/or the distributed database system. The monitoring module can be used to monitor the state and/or the operating behavior of an applicable sending apparatus and/or an applicable receiving apparatus and/or the distributed database system and e.g. to store it/them in a file (e.g. a logging file).

FIG. 4 shows a fourth example embodiment of the embodiment of the present invention as a flow diagram of the method according to the present invention.

The method is implemented in a computer-aided manner.

Specifically, a method for the computer-aided receiving of messages is implemented in this example embodiment.

The method comprises a first method step 410 for receiving first messages from a distributed database system by means of a first communication interface. The first messages are stored, for example, in a data format (e.g. an XML data format) of the distributed database system or of a network application.

The method comprises a second method step 420 for calculating an association for the first messages, wherein the calculating involves determining which devices an applicable first message is intended for.

The method comprises a third method step 430 for converting the message content of the applicable first message into a data format for the associated device. The data format is, in particular, a proprietary data format of the devices.

The third method step is, in particular, an optional method step. This is the case, for example, if the message content of the applicable first message does not have to be converted or the message content or the applicable first message has a data format which can be processed by the devices. In such a case, the converted message content of the fourth method step corresponds to the (unconverted) message content of the applicable first message, or the applicable first message is transmitted as the second message to the applicable device(s).

The method comprises a fourth method step 440 for transmitting the converted message content to the device associated with the applicable first message.

FIG. 5 shows a fifth example embodiment of the embodiment of the present invention as a flow diagram of the method according to the present invention.

The method is implemented in a computer-aided manner.

Specifically, a method for the computer-aided sending of messages is in this example embodiment.

The method comprises a first method step 510 for receiving first (further) messages from devices by means of a communication interface. These messages are stored, for example, in a proprietary data format of the devices.

The method comprises a second method step 520 for calculating an association on the basis of the respective message content of the first (further) messages, wherein it is calculated which device has sent an applicable first further message.

The method comprises a third method step 530 for converting the message content of the applicable first (further) message into a data format for the distributed database system (or the network application), wherein the data format can be processed e.g. by the distributed database system (or the network application). The data format may e.g. be an XML data format for which a suitable XML scheme is available. The nodes of the distributed database system (or of the network application) can thus evaluate e.g. a device status of one of the devices of the automation network in order e.g. to send a message to the applicable automation network or to the applicable device depending on the device state.

The third method step is, in particular, an optional method step. This is the case, for example, if the message content of the applicable first message does not have to be converted or the message content or the applicable first message has a data format which can be processed by the distributed database system (or the network application). In such a case, the converted message content of the fourth method step corresponds to the (unconverted) message content of the applicable first message, or the applicable first message is transmitted as the second message to the distributed database system (or to the network application).

The method comprises a fourth method step 540 for transmitting the converted message content to the distributed database system (or the network application).

The embodiment of the present invention relates, for example, to a gateway or a network adapter with which old devices or legacy devices can be connected to a distributed database system (or to a network application) such as a blockchain without having to modify a configuration in the old devices.

Correspondingly, for example, the messages sent or received by the distributed database system (or the network application) are transactions. Correspondingly, for example, the messages transmitted to the distributed database system (or the network application) are transactions.

If, for example, the second network NW2 with its devices (FIGS. 1-3) is, for example, also a distributed database system (or a network application), two different distributed database systems (or network applications) can also communicate with one another, for example, by means of the present invention (devices, system, method).

Further embodiments, aspects and example embodiments of the embodiment of the present invention are explained below.

A receiving apparatus (E), comprising:
a first communication interface (210), wherein
the first network interface or communication interface (e.g. the first communication interface) is configured to communicate with a distributed database system,
the first communication interface is configured to receive first messages from the distributed database system;
an identification module (220), wherein
the identification module is configured to use the respective message content of the first messages to calculate an association concerning which devices an applicable first message is intended for;
a conversion module (230), wherein
the conversion module is configured to convert the message content of the applicable first message into a data format for the associated device;
a second communication interface (240), wherein
the second communication interface is configured to transmit the converted message content to the device associated with the applicable first message.

In further embodiments of the receiving apparatus, the receiving apparatus retrieves a device state from the device associated with an applicable first message, wherein a transmission to the associated device is effected on the basis of the retrieved device state.

In further embodiments of the receiving apparatus, the device state comprises a data record about the available device resources and/or current device properties.

In further embodiments of the receiving apparatus, a transmission to the applicable device is effected if prescribed requirements of the applicable first message are met by the associated device, wherein, for example, the meeting of the prescribed requirements is checked on the basis of the device state.

In further embodiments of the receiving apparatus, the receiving apparatus comprises a cryptography module, wherein the cryptography module comprises cryptographic data associated with the devices.

In further embodiments of the receiving apparatus, the cryptography module uses the cryptographic data to check and/or decrypt at least a part of the message content of the applicable first message for an associated device, wherein, for example, the applicable cryptographic data are loaded on the basis of the associated device for the checking and/or decrypting.

A sending apparatus (S), having
a first communication interface (310), wherein
the first communication interface is configured to communicate with devices, the communication interface is configured to receive first messages from the devices;
an identification module (320), wherein
the identification module is configured to use the respective message content of the first messages to calculate an association concerning which device has sent an applicable first message;
a conversion module (330), wherein
the conversion module is configured to convert the message content of the applicable first message into a data format for the distributed database system;
a second communication interface (340), wherein
the second communication interface is configured to communicate with a distributed database system,
the communication interface is configured to transmit the converted message content to the distributed database system.

In further embodiments of the sending apparatus (S), the sending apparatus comprises a cryptography module, wherein the cryptography module comprises cryptographic data associated with the devices.

In further embodiments of the sending apparatus (S), the cryptography module uses the associated device to load applicable cryptographic data, wherein at least a part of the message content of the applicable first message is cryptographically protected in a device-specific manner for the associated device by means of the applicable cryptographic data, and wherein, for example, the cryptographic protection is effected before the transmission of the message content.

In further embodiments of the sending apparatus (S) and/or of the receiving apparatus (E), the distributed database system is a blockchain, wherein, for example, the messages which are sent and/or received by the distributed database system are transactions.

In further embodiments of the sending apparatus (S) and/or the receiving apparatus (E), at least some of the devices are devices of an automation network.

A system (SYS), having:
a receiving apparatus (E) or one of its embodiments;
a sending apparatus (S) or one of its embodiments.

A method for the computer-aided receiving of messages, having the following method steps:
receiving first messages from a distributed database system by means of a first communication interface;
calculating an association for the first messages, wherein the calculating involves determining which devices an applicable first message is intended for;
converting the message content of the applicable first message into a data format for the associated device;
transmitting the converted message content to the device associated with the applicable first message.

A method for the computer-aided sending of messages, having the following method steps:
receiving first messages from devices by means of a communication interface;
calculating an association on the basis of the respective message content of the first messages, wherein it is calculated which device has sent an applicable first further message;
converting the message content of the applicable first message into a data format for the distributed database system;
transmitting the converted message content to the distributed database system.

Although the embodiment of the present invention has been illustrated and described in greater detail by means of the example embodiments, the present invention is not limited by the disclosed examples and other variations may be derived therefrom by the person skilled in the art without departing from the protective scope of the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A receiving apparatus, comprising:
a first communication interface, wherein;
the first communication interface is configured to receive first messages from a distributed database system;
one or more processors configured to execute program commands, wherein;
the one or more processors are configured to use respective message content of the first messages to calculate an association concerning which devices an applicable first message of the first messages is intended for;
the one or more processors are configured to convert the message content of the applicable first message into a data format for the associated device;
a cryptography module, wherein the cryptography module comprises cryptographic data associated with the devices, the cryptographic data are ascertained on the basis of a combination of explicit device-specific data and receiving-apparatus-specific data, and the cryptographic data are reproducibly ascertained for the applicable device, wherein the cryptographic module uses the cryptographic data to check and/or decrypt at least some of the message content of the applicable first message for an associated device, wherein the checking and/or decrypting involves the applicable cryptographic data being loaded on a basis of a device associated with the data;

a second communication interface, wherein; and
the second communication interface is configured to transmit the converted data to the device associated with the applicable first message.

2. The receiving apparatus as claimed in claim 1, wherein:
the receiving apparatus retrieves a device state from the device associated with the data; and
a transmission to the associated device is effected on the basis of the retrieved device state.

3. The receiving apparatus as claimed in claim 2, wherein the device state comprises a data record about the available device resources and/or current device properties.

4. The receiving apparatus as claimed in claim 1, wherein:
a transmission to the applicable device is effected if prescribed requirements of the applicable data are met by the associated device; and
the meeting of the prescribed requirements is checked on the basis of the device state.

5. The receiving apparatus as claimed in claim 1, wherein the conversion module is configured to use the device to check which data from the data can be processed by the device.

6. A sending apparatus, comprising:
a first communication interface, wherein;
the first communication interface is configured to communicate with devices;
the first communication interface is configured to receive first messages from the devices;
one or more processors configured to execute program commands, wherein;
the one or more processors are configured to use respective message content of the first messages to calculate an association concerning which device has sent an applicable first message;
wherein;
the one or more processors are configured to convert the message content of the applicable first message into a data format for the distributed database system;
a cryptography module, wherein the cryptography module comprises cryptographic data associated with the devices, the cryptographic data are ascertained on the basis of a combination of explicit device-specific data and receiving-apparatus-specific data, and the cryptographic data are reproducibly ascertained for the applicable device, wherein the cryptographic module uses the cryptographic data to load applicable cryptographic data, and wherein the applicable cryptographic data are used to cryptographically protect at least some of the message content of the applicable first message in device-specific fashion for the associated device;
a second communication interface, wherein:
the second communication interface is configured to communicate with a distributed database system, and wherein the second communication interface is configured to transmit the converted message content to the distributed database system.

7. The sending apparatus as claimed in claim 6, wherein:
at least a part of the message content of the applicable first message is cryptographically protected in a device-specific manner for the associated device by means of the applicable cryptographic data and
the cryptographic protection is effected before the transmission of the message content or of the data.

8. The sending apparatus and/or receiving apparatus as claimed in claim 6, wherein:
the distributed database system is a blockchain; and
the messages which are sent and/or received by the distributed database system are transactions.

9. The sending apparatus and/or receiving apparatus as claimed in claim 6, wherein at least some of the devices are devices of an automation network.

10. A system, comprising:
a receiving apparatus as claimed in claim 1; and
a sending apparatus.

11. A method for the computer-aided receiving of data, the method comprising:
receiving first messages from a distributed database system by means of a first communication interface;
calculating an association for the first messages, wherein the calculating involves determining which devices an applicable first message of the first messages is intended for;
converting the message content of the applicable first message into a data format for the associated device;
loading cryptographic data on the basis of the associated device, wherein the cryptographic data are associated with the associated device and the cryptographic data are ascertained on the basis of a combination of explicit device-specific data and receiving-apparatus-specific data, and the cryptographic data are reproducibly ascertained for the applicable device;
checking and/or decrypting at least some of the message content of the applicable first message for the associated device on the basis of the cryptographic data; and
transmitting the converted message content to the device associated with the applicable first message.

12. A method for the computer-aided sending of messages or data, the method comprising:
receiving first messages from devices by means of a communication interface;
calculating an association on a basis of respective message content of the first messages, wherein it is calculated which device has sent an applicable first further message;
converting the message content of the applicable first message into a data format for the distributed database system;
loading cryptographic data on the basis of the associated device, wherein the cryptographic data are associated with the associated device, and the cryptographic data are ascertained on the basis of a combination of explicit device-specific data and sending-apparatus-specific data, and the cryptographic data are reproducibly ascertained for the applicable device, wherein the applicable cryptographic data are used to cryptographically protect at least some of the message content of the applicable first message in device-specific fashion for the associated device; and
transmitting the converted message content to the distributed database system.

13. A computer program product, comprising a computer readable hardware storage device having computer readable program code stored therein, said program code executable by a processor of a computer system to implement a method as claimed in claim 12.

14. A providing apparatus for the computer program product as claimed in claim 13, wherein the providing apparatus stores and/or provides the computer program product.

* * * * *